United States Patent
Lee et al.

(10) Patent No.: US 12,239,284 B2
(45) Date of Patent: Mar. 4, 2025

(54) CLEANING DEVICE AND METHOD FOR CONTROLLING SAME

(71) Applicant: SAMSUNG ELECTRONICS CO., LTD., Suwon-si (KR)

(72) Inventors: Junghwan Lee, Suwon-si (KR); Yeongrok Lee, Suwon-si (KR); Hyunseok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 817 days.

(21) Appl. No.: 17/289,029

(22) PCT Filed: Nov. 5, 2019

(86) PCT No.: PCT/KR2019/014907
§ 371 (c)(1),
(2) Date: Apr. 27, 2021

(87) PCT Pub. No.: WO2020/101244
PCT Pub. Date: May 22, 2020

(65) Prior Publication Data
US 2021/0401250 A1 Dec. 30, 2021

(30) Foreign Application Priority Data
Nov. 12, 2018 (KR) .................. 10-2018-0138296

(51) Int. Cl.
*A47L 9/04* (2006.01)
*A47L 9/00* (2006.01)
*A47L 9/28* (2006.01)

(52) U.S. Cl.
CPC .......... *A47L 9/2826* (2013.01); *A47L 9/0072* (2013.01); *A47L 9/2847* (2013.01); *A47L 9/2852* (2013.01);
(Continued)

(58) Field of Classification Search
None
See application file for complete search history.

(56) References Cited

U.S. PATENT DOCUMENTS 10,452,071 B1 * 10/2019 Ebrahimi Afrouzi ........................ B25J 9/1676
10,918,250 B2  2/2021 Lee et al.
(Continued)

FOREIGN PATENT DOCUMENTS

EP  2 266 449   1/2015
JP  02-080020   3/1993
(Continued)

OTHER PUBLICATIONS

Translation of WO2007074035 by Windorfer, published Jul. 5, 2007.*
(Continued)

*Primary Examiner* — Mikhail Kornakov
*Assistant Examiner* — Ryan L Coleman
(74) *Attorney, Agent, or Firm* — Nixon & Vanderhye, P.C.

(57) ABSTRACT

Provided is a cleaning device including a suction port; at least one sensor configured to sense at least one object; a driver configured to open or close the suction port; a memory storing at least one instruction; and a processor configured to execute the at least one instruction stored in the memory. The processor executes the at least one instruction to sense at least one object within an area to be cleaned by the cleaning device by controlling the at least one sensor, identify a relative location of the sensed at least one object with respect to the cleaning device, determine at least a partial area within an entire area of the suction port as an open/close target area, based on the identified relative location of the at least one object, and open or close the open/close target area by controlling the driver.

15 Claims, 29 Drawing Sheets

(52) U.S. Cl.
CPC ....... *A47L 2201/04* (2013.01); *A47L 2201/06* (2013.01)

(56) References Cited

U.S. PATENT DOCUMENTS

| | | | |
|---|---|---|---|
| 2005/0076466 | A1 | 4/2005 | Yan |
| 2013/0085603 | A1* | 4/2013 | Chiappetta ........... G05D 1/0272 901/1 |
| 2019/0117028 | A1 | 4/2019 | Jeong et al. |

FOREIGN PATENT DOCUMENTS

| | | | |
|---|---|---|---|
| JP | 2005211362 | * | 8/2005 |
| JP | 2014-000150 | | 1/2014 |
| KR | 10-0495060 | | 6/2005 |
| KR | 10-2010-0137080 | | 12/2010 |
| KR | 10-2015-0136872 | | 12/2015 |
| KR | 10-1572436 | | 12/2015 |
| KR | 10-2017-0122001 | | 11/2017 |
| KR | 10-2018-0043148 | | 4/2018 |
| WO | WO2007074035 | * | 7/2007 |

OTHER PUBLICATIONS

Translation of JP2005211362 by Takenaka, published Aug. 11, 2005.*
Notice of Non-Final Rejection dated Jan. 13, 2021 in counterpart Korean Patent Application No. 10-2018-0138296 and English-language translation.
Search Report and Written Opinion dated Feb. 21, 2020 in counterpart International Patent Application Patent Application No. PCT/KR2019/014907.

* cited by examiner

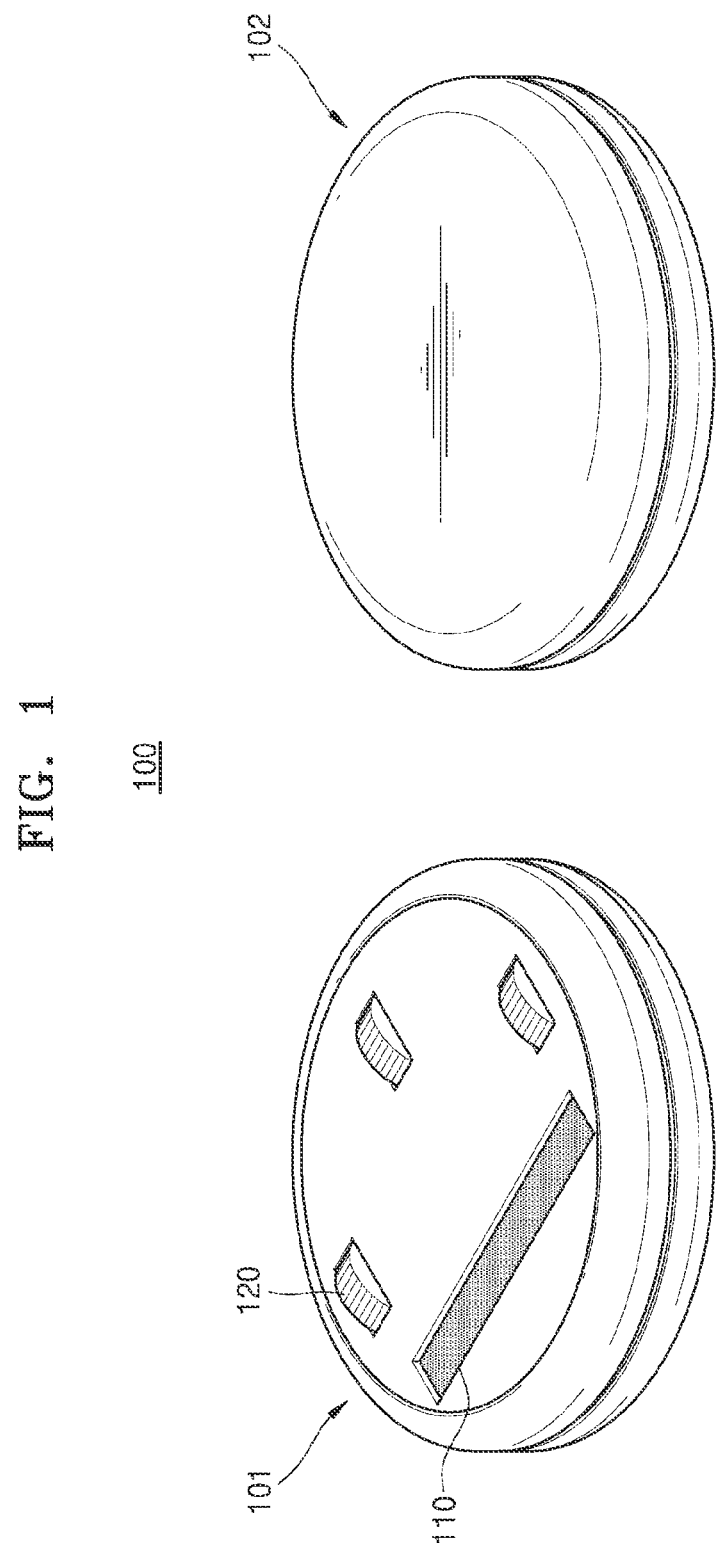

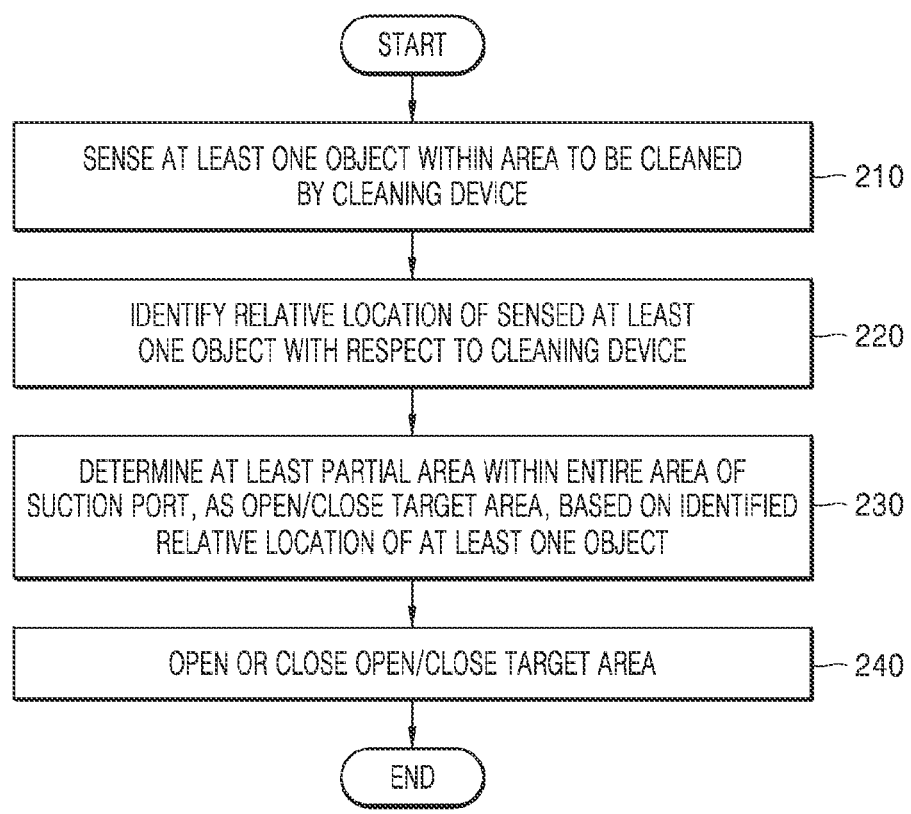

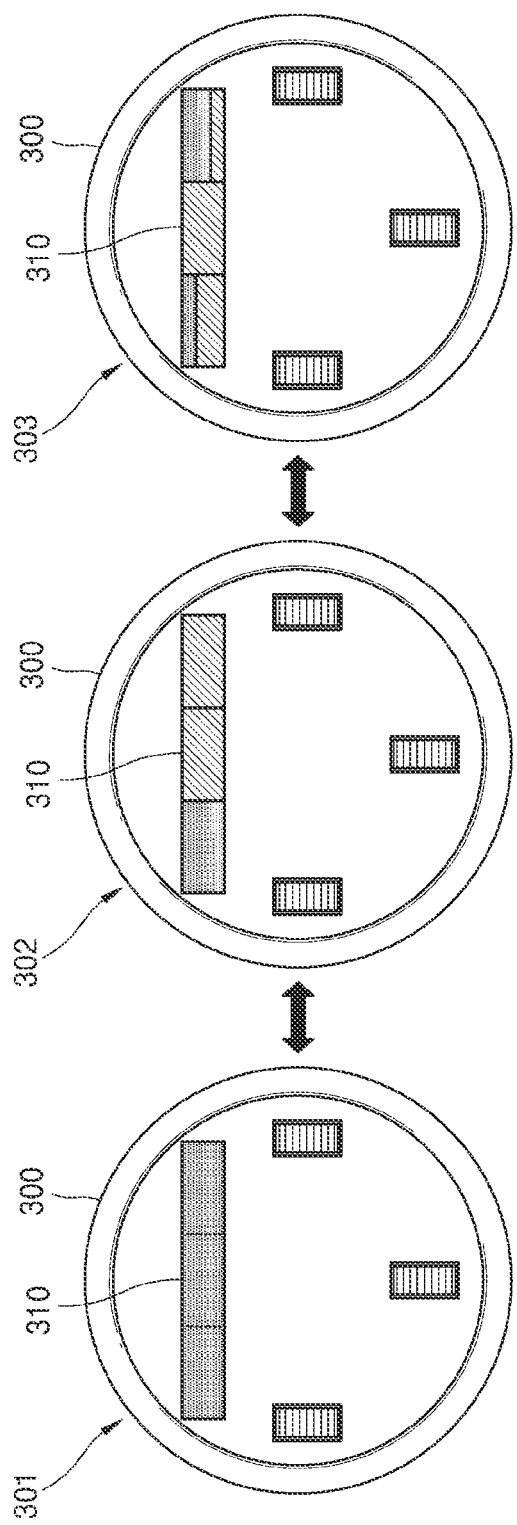

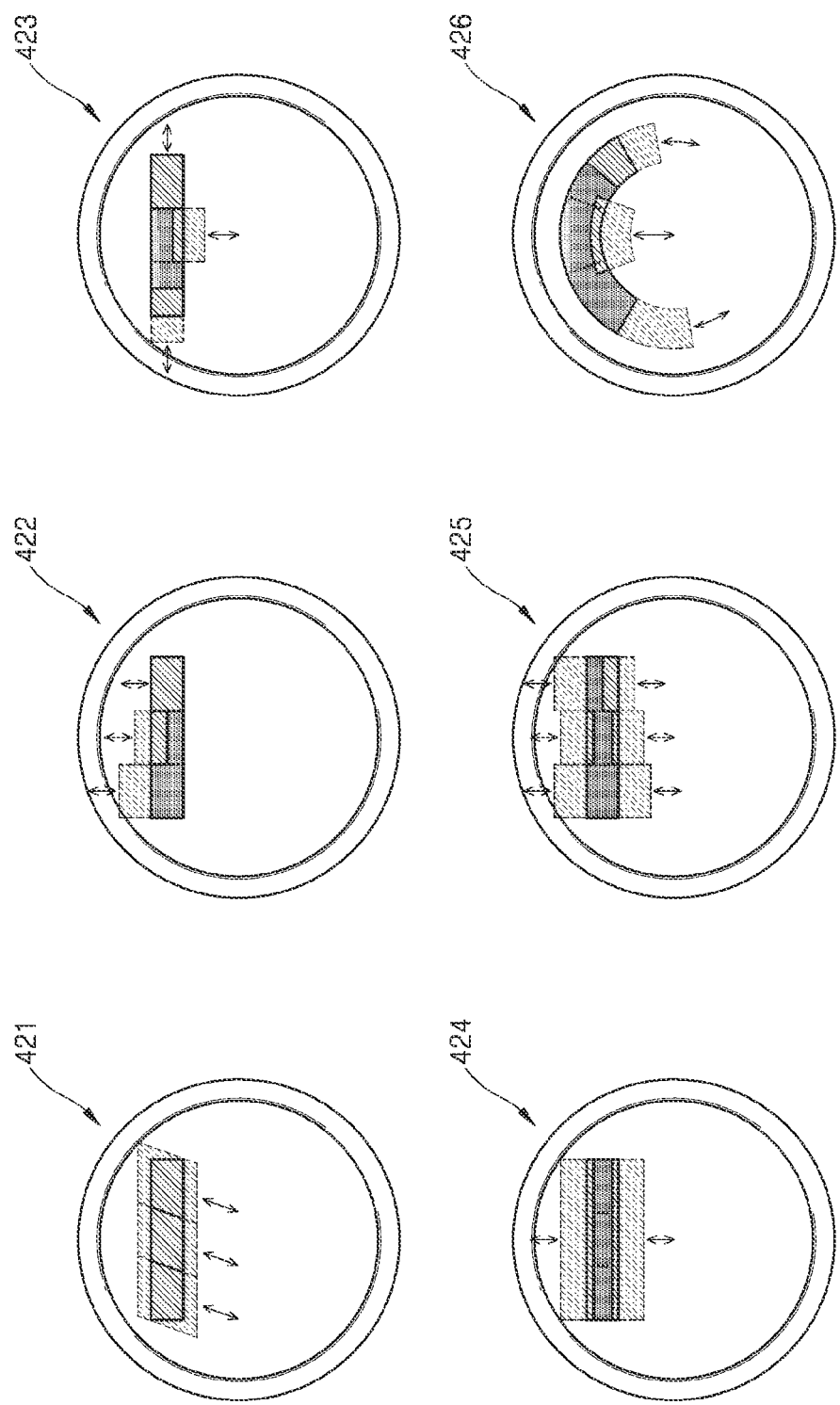

FIG. 6A
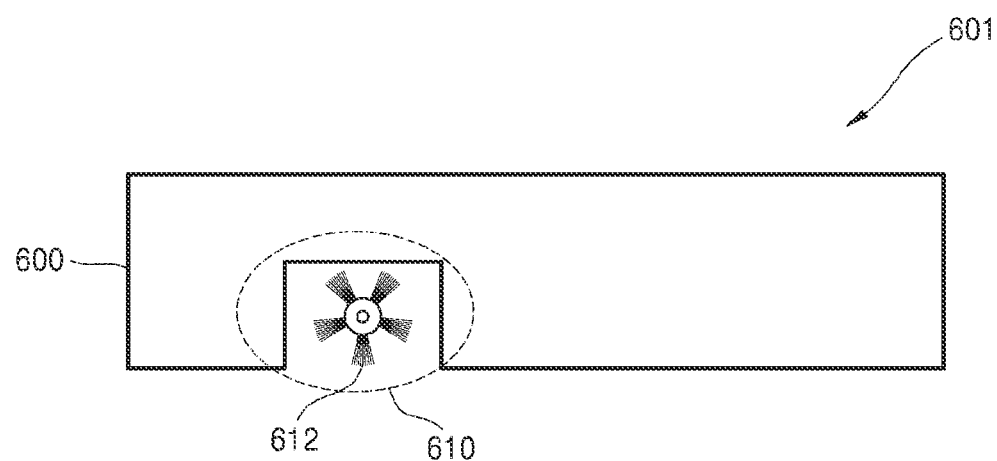
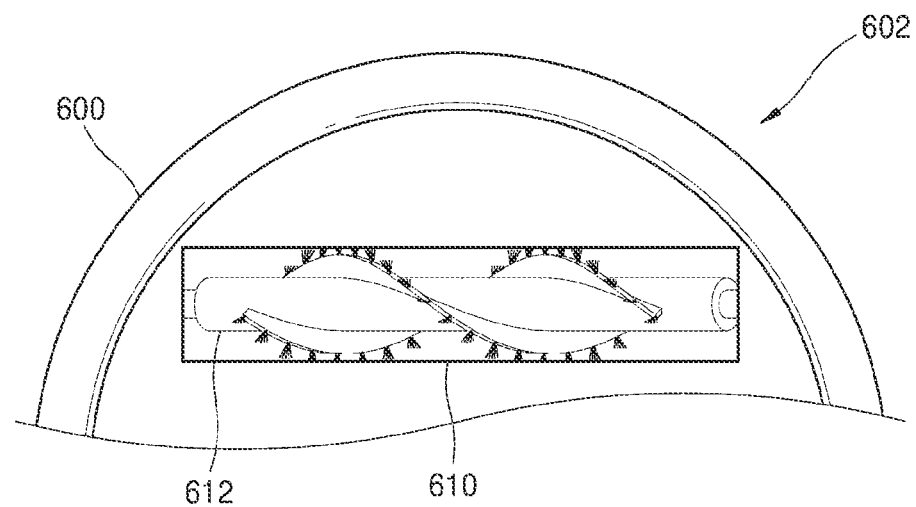

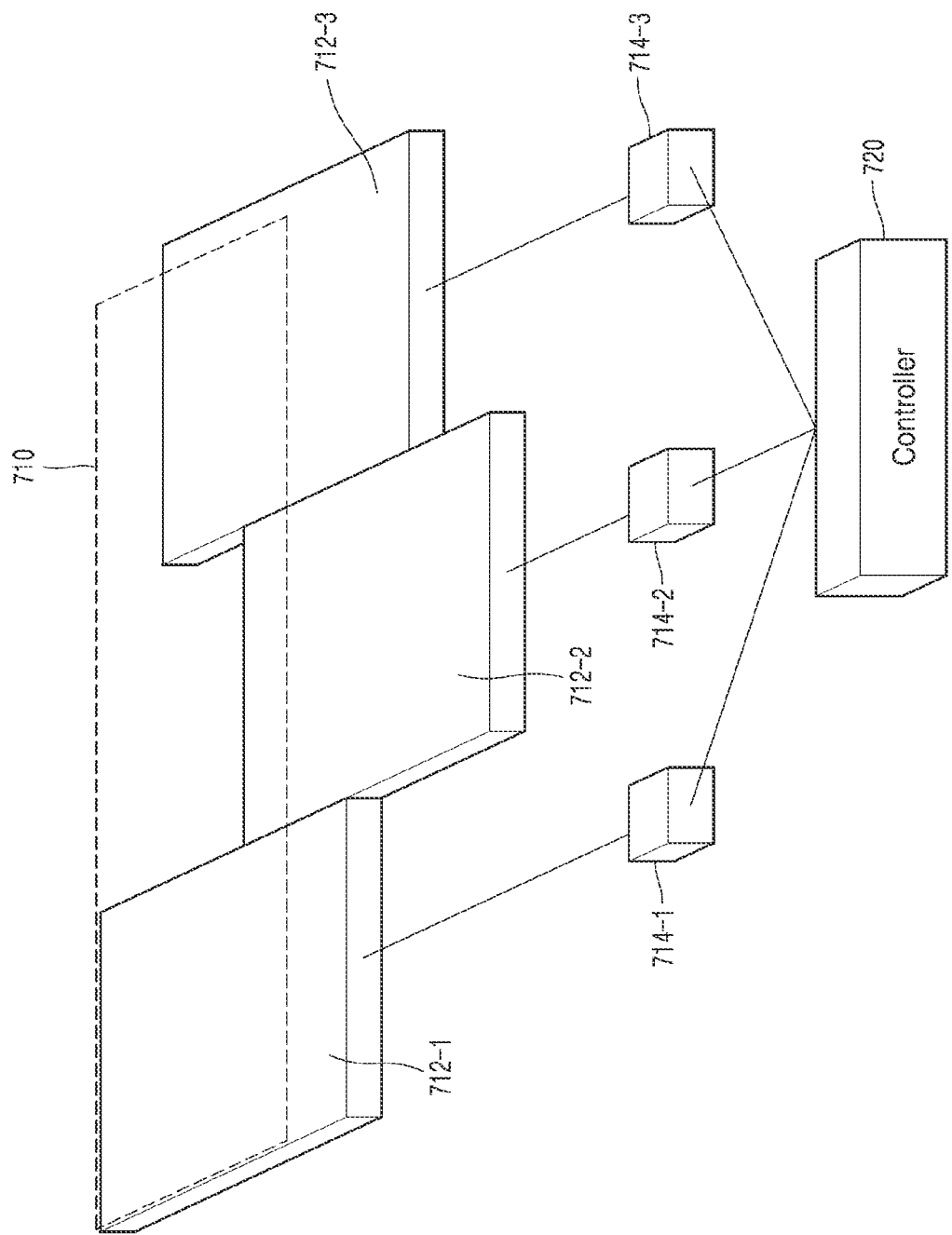

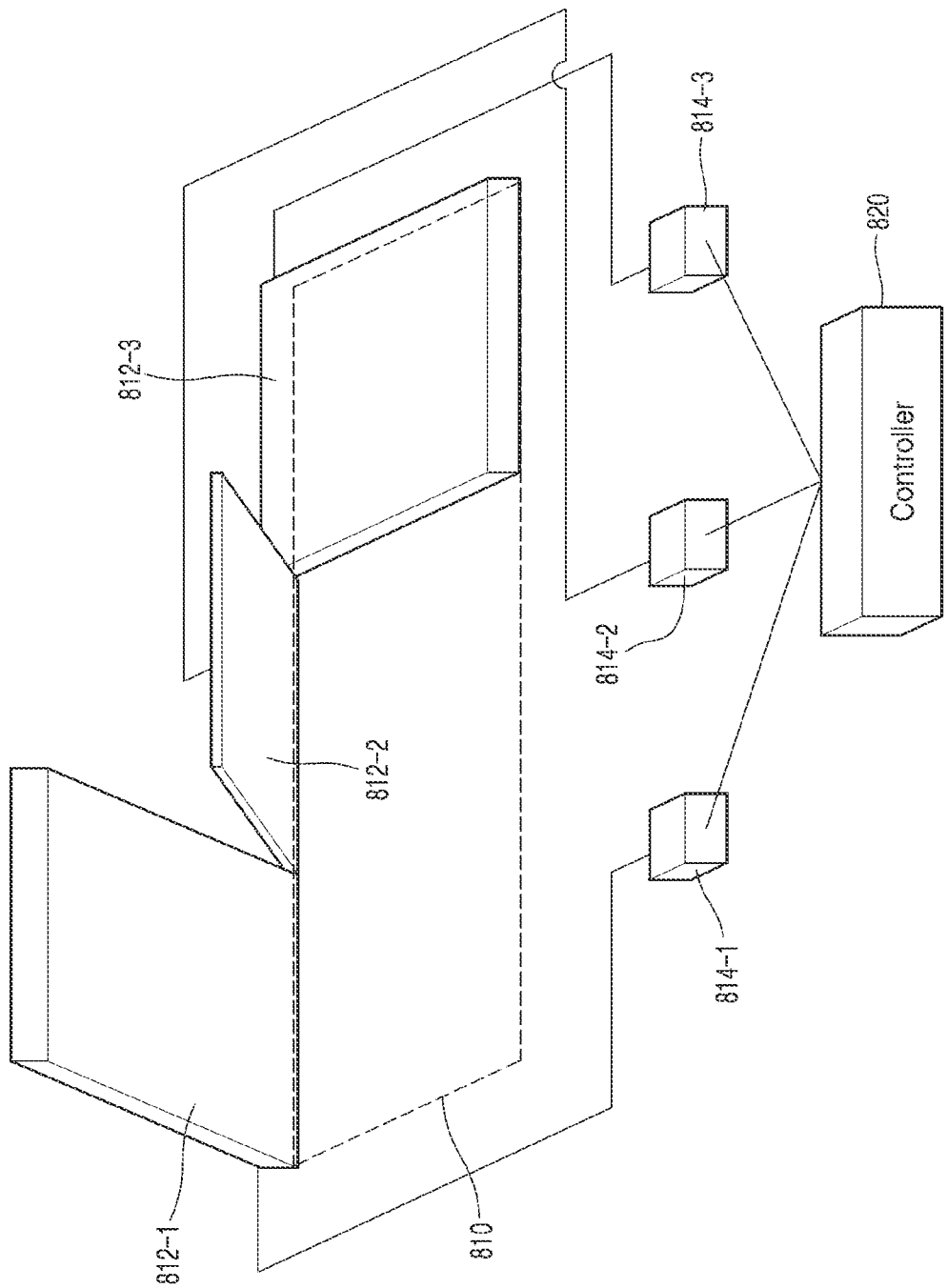

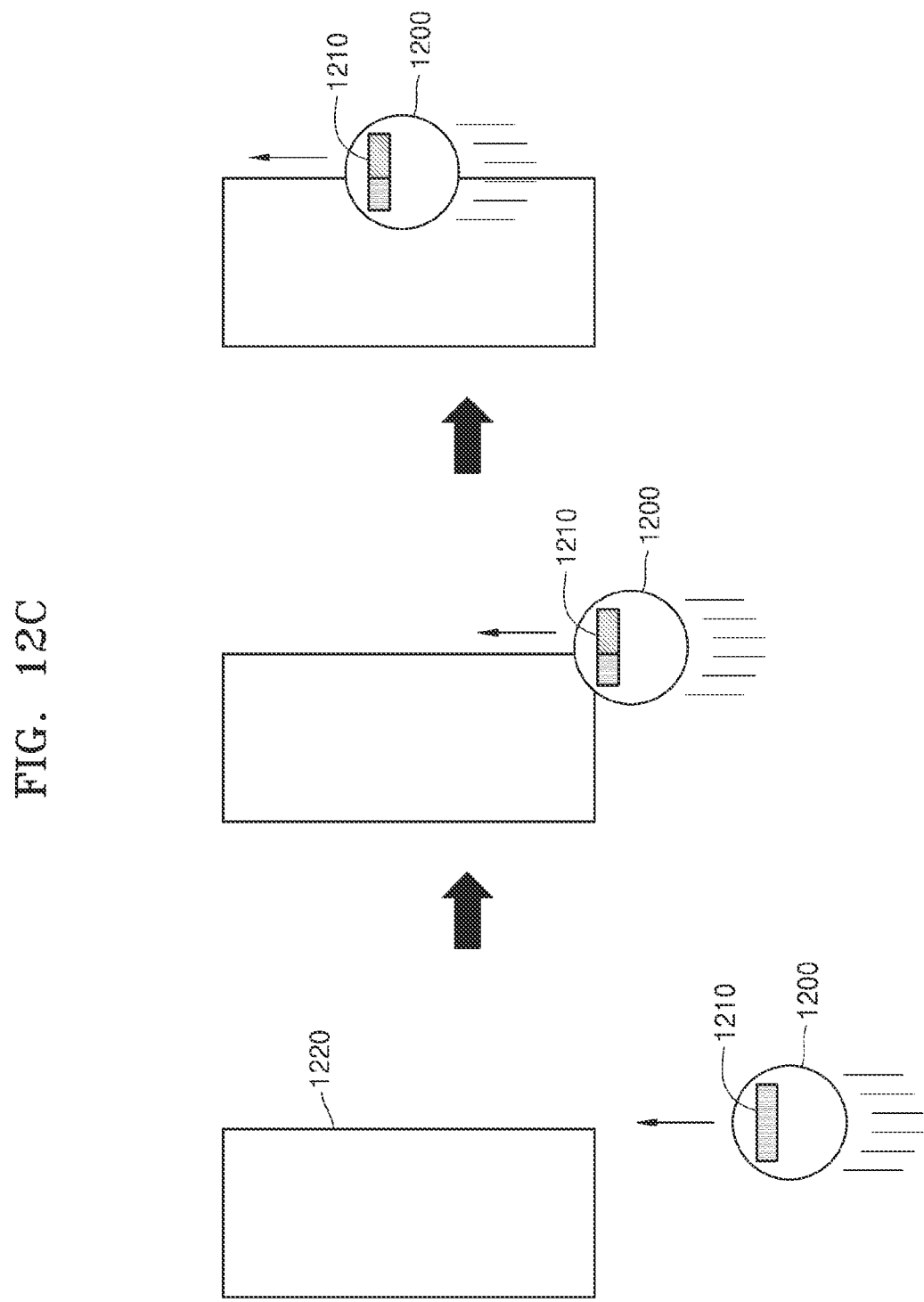

CLEANING DEVICE AND METHOD FOR CONTROLLING SAME

This application is the U.S. national phase of International Application No. PCT/KR2019/014907 filed Nov. 5, 2019 which designated the U.S. and claims priority to KR Patent Application No. 10-2018-0138296 filed Nov. 12, 2018, the entire contents of each of which are hereby incorporated by reference.

TECHNICAL FIELD

The present disclosure relates to a cleaning device and a method of controlling the same.

BACKGROUND ART

In general, robots have been developed for industrial use and have been responsible for a part of factory automation. In recent years, the field of application of robots has been further expanded, and thus medical robots and aerospace robots are being developed, and home robots that can be used in general homes are also being developed. As an example of a home robot, there is a robot cleaner that automatically performs a cleaning operation without a user's manipulation.

Robot cleaners suck a material through a suction port by using a suction force generated by a fan motor included therein.

DESCRIPTION OF EMBODIMENTS

Solution To Problem

Provided are a cleaning device capable of efficiently controlling a suction port, and a method of controlling the cleaning device.

BRIEF DESCRIPTION OF DRAWINGS

FIG. 1 is a perspective view of a cleaning device according to an embodiment of the present disclosure.

FIG. 2 is a flowchart of a method, performed by a cleaning device according to an embodiment of the present disclosure, of controlling a suction port within the cleaning device.

FIG. 3 is a view for explaining a method, performed by a cleaning device according to an embodiment of the present disclosure, of controlling a suction port within the cleaning device.

FIGS. 4A and 4B are views for explaining a plurality of partitions for opening and closing a suction port in a cleaning device according to an embodiment of the present disclosure, and a method in which the plurality of partitions open and close the suction port.

FIGS. 6A, 6B, and 6C are views for explaining a method, performed by a cleaning device according to an embodiment of the present disclosure, of controlling movement of at least one partition by controlling rotation of a brush.

FIGS. 7 and 8 are views for explaining a method, performed by a cleaning device according to an embodiment of the present disclosure, of opening or closing an open/close target area of a suction port by moving a plurality of partitions by controlling a driver.

FIG. 12C is a view for explaining a method, performed by a cleaning device, of determining an open/close target area of a suction port when an object that changes an inclination of the cleaning device is sensed, according to an embodiment of the present disclosure.

BEST MODE

Figure 4A:
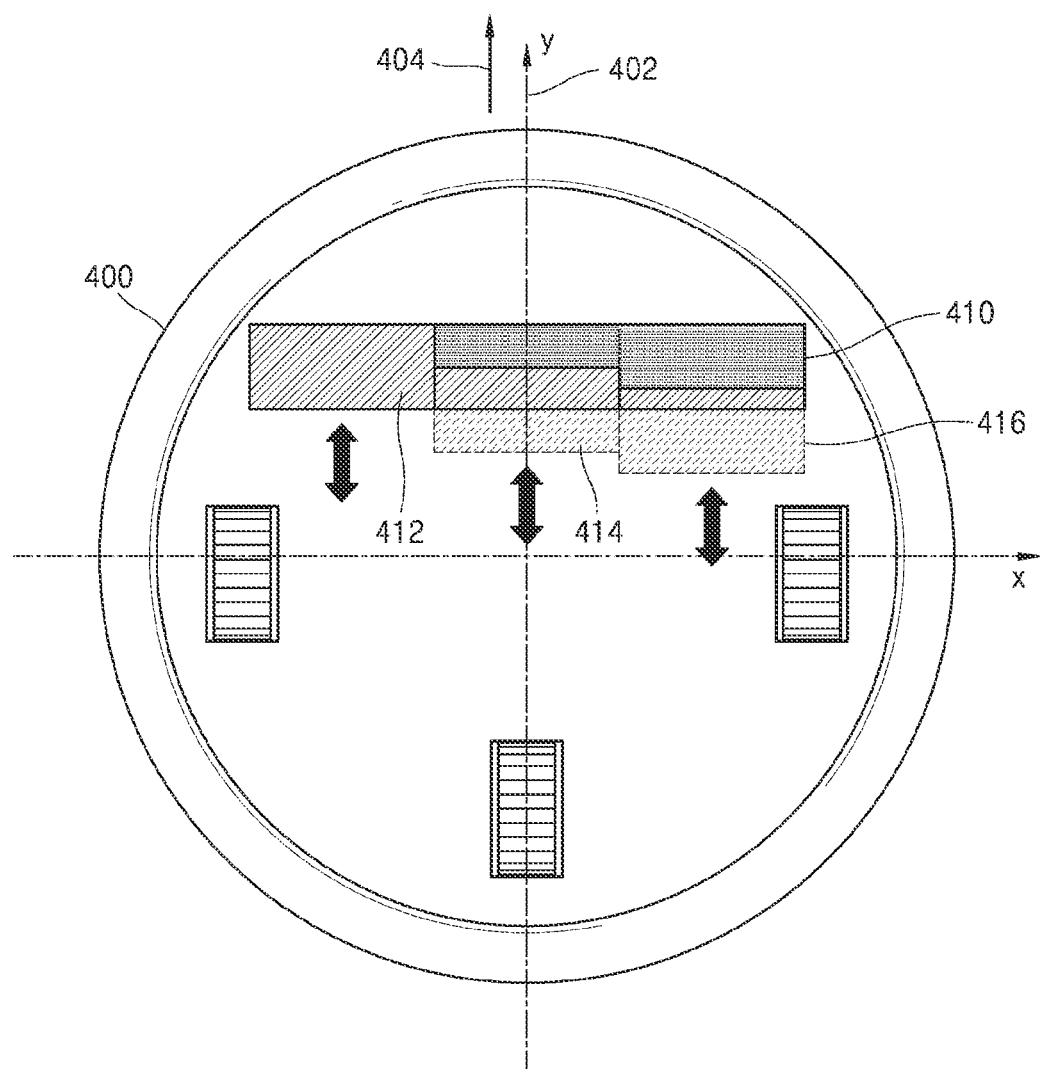

According to an aspect of the present disclosure, a method, performed by a cleaning device, of controlling a suction port within the cleaning device includes sensing at least one object within an area to be cleaned by the cleaning device; identifying a relative location of the sensed at least one object with respect to the cleaning device; determining at least a partial area within an entire area of the suction port as an open/close target area, based on the identified relative location of the at least one object; and opening or closing the open/close target area.

The method may further include determining an open/close degree of the open/close target area, based on the identified relative location of the at least one object. The opening or closing of the open/close target area may include opening or closing the open/close target area according to the determined open/close degree.

The method may further include identifying a location of the sensed at least one object within the area to be cleaned; and identifying a location of the cleaning device. The determining of the at least a partial area within the entire area of the suction port as the open/close target area may include determining at least a partial area within the entire area of the suction port, as the open/close target area, based on the location of the cleaning device and the location of the at least one object.

The opening or closing of the open/close target area may include opening or closing the open/close target area by moving at least one partition for opening or closing the open/close target area from among a plurality of partitions for opening or closing the suction port.

The entire area of the suction port may be split into a plurality of areas. The plurality of areas may include a first split area, a second split area, and a third split area. The first split area, the second split area, and the third split area may be adjacent to each other. A first partition from among the plurality of partitions may move to open or close the first split area and the second split area, and a second partition from among the plurality of partitions may move to open or close the second split area and the third split area.

The opening or closing of the open/close target area may further include determining a direction to move the at least one partition, based on a movement direction of the cleaning device; and opening or closing the open/close target area by moving the at least one partition in the determined direction.

The opening or closing of the open/close target area may include rotating a brush provided in the suction port. Movement of the at least one partition in contact with the rotating brush may be controlled by the rotating brush.

The method may further include identifying whether the at least one object is an object that blocks movement of the cleaning device. The determining of the open/close target area may include, when the at least one object is identified as an object that blocks movement of the cleaning device, determining the open/close target area, based on a location of the cleaning device, a direction in which movement of the cleaning device is blocked, and the identified relative location of the at least one object.

The method may further include sensing an inclination of the cleaning device. The determining of the open/close target area may include, when an inclination of the cleaning device moving over the at least one object is changed to a preset angle or greater, determining the open/close target area, based on a location of the at least one object located below the cleaning device.

The method may further include photographing the at least one object; and determining whether the at least one object is a to-be-cleaned object. The determining of the open/close target area may include determining whether to open or close the suction port, based on whether the at least one object is a to-be-cleaned object.

The opening or closing of the open/close target area may include opening the open/close target area within the entire area of the suction port after the entire area of the suction port is closed.

The method may further include determining whether the at least one object is a to-be-cleaned object, by using a learning network model previously generated based on characteristics of at least one to-be-cleaned object and at least one not-to-be-cleaned object obtained by the cleaning device.

According to another aspect of the present disclosure, a cleaning device includes a suction port; at least one sensor configured to sense at least one object; a driver configured to open or close the suction port; a memory storing at least one instruction; and a processor configured to execute the at least one instructions stored in the memory. The processor executes the at least one instruction to sense at least one object within an area to be cleaned by the cleaning device by controlling the at least one sensor, identify a relative location of the sensed at least one object with respect to the cleaning device, determine at least a partial area within an entire area of the suction port as an open/close target area, based on the identified relative location of the at least one object, and open or close the open/close target area by controlling the driver.

According to another aspect of the present disclosure, a computer program product includes a recording medium having recorded thereon a program for executing the operations of sensing at least one object within an area to be cleaned by a cleaning device; identifying a relative location of the sensed at least one object with respect to the cleaning device; determining at least a partial area within an entire area of the suction port as an open/close target area, based on the identified relative location of the at least one object; and opening or closing the open/close target area.

MODE OF DISCLOSURE

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein. In the drawings, parts irrelevant to the description are omitted for simplicity of explanation, and like numbers refer to like elements throughout.

Although general terms widely used at present were selected for describing the disclosure in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

While such terms as "first," "second," etc., may be used to describe various components, such components must not be limited to the above terms. The above terms are used only to distinguish one component from another.

The terms used in the disclosure are merely used to describe particular embodiments, and are not intended to limit the scope of the disclosure. An expression used in the singular encompasses the expression of the plural, unless it has a clearly different meaning in the context. Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this disclosure, specify the presence of stated elements, but do not preclude the presence or addition of one or more other elements.

The use of the terms "a" and "an" and "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. Embodiments of the disclosure are not limited to the described order of the operations.

Thus, the expression "according to some embodiments" or "according to an embodiment" used in the entire disclosure does not necessarily indicate the same embodiment.

The aforementioned embodiments may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein could employ any number of conventional techniques for electronics configuration, signal processing and/or control, data processing and the like. The words "mechanism," "element," "means," and "configuration" are used broadly and are not limited to mechanical or physical embodiments, Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

The disclosure will now be described more fully with reference to the accompanying drawings, in which exemplary embodiments are shown.

For a cleaning device according to an embodiment of the present disclosure, the same or different reference numerals are assigned to each embodiment. However, this is only for description of each embodiment, and cleaning devices indicated by different reference numerals may refer to the same cleaning device. For example, cleaning devices 300, 400, 501, 600, 900, 1000, 1100, 1200, 1300, 1400, 1500, 1600, and 1700, which are indicated by different reference numerals, may each correspond to a cleaning device 100, and may refer to as the same cleaning device.

FIG. 1 is a perspective view of a cleaning device 100 according to an embodiment of the present disclosure.

The cleaning device 100 according to an embodiment of the present disclosure may be a robot cleaner. The cleaning device 100 may autonomously move without user's manipulations for moving the cleaning device 100. The cleaning device 100 may also move according to user's manipulations for moving the cleaning device 100. The cleaning device 100 according to an embodiment of the present disclosure may be a manual cleaner including a handle, rather than a robot cleaner. Although the cleaning device 100 and a method of controlling the same will be described herein on the premise that the cleaning robot 100 is a robot cleaner, the type of the cleaning device 100 is not limited to a robot cleaner, and may be any of various types of cleaners including a suction port.

FIG. 1 illustrates a bottom surface 101 and a top surface 102 of the cleaning device 100 according to an embodiment of the present disclosure. The cleaning device 100 includes a suction port 110. The cleaning device 100 may perform a cleaning operation by sucking a material around the suction port 110 through the suction port 110. The cleaning device 100 includes a fan motor (not shown) provided in a driver, and the fan motor generates a suction force. The cleaning device 100 sucks a material through the suction port 110 by using the suction force generated by the fan motor.

A method, performed by the cleaning device 100, of controlling the suction port 110 will now be described in detail with reference to the accompanying drawings.

The cleaning device 100 according to an embodiment of the present disclosure may include wheels 120. The cleaning device 100 may move by using the wheels 120. However, this is merely an embodiment, and the cleaning device 100 may not include the wheels 120 and a method in which the cleaning device 100 moves is not limited to the method using wheels.

Although FIG. 1 illustrates an example of the cleaning device 100, the cleaning device of FIG. 1 may be changed to various forms. For example, the cleaning device 100 may include an arbitrary number of suction ports 110 and an arbitrary number of wheels 120, and locations on the cleaning device 100 where the suction port 110 and the wheels 120 are provided may be changed. For example, the cleaning device 100 may further include other components in addition to the suction port 110 and the wheels 120 shown in FIG. 1. For example, the cleaning device 100 may include at least one sensor on the bottom surface 101 or the top surface 102. The at least one sensor that may be included in the cleaning device 100 will be described in detail with reference to FIG. 9.

FIG. 2 is a flowchart of a method, performed by a cleaning device according to an embodiment of the present disclosure, of controlling a suction port within the cleaning device.

In operation 210, the cleaning device 100 according to an embodiment of the present disclosure senses at least one object within an area to be cleaned by the cleaning device 100.

The at least one object within the area to be cleaned may be an object to be cleaned (hereinafter, referred to as a to-be-cleaned object) that the cleaning device 100 needs to inhale through the suction port 110, or may be an object not to be cleaned (hereinafter, referred to as a not-to-be-cleaned object) that the cleaning device 100 does not need to inhale or should not inhale. For example, the to-be-cleaned object may contain foreign materials such as dust, hair, and food debris. For example, the not-to-be-cleaned object that the cleaning device 100 does not need to inhale may include obstacles such as walls, furniture, and home appliances. For example, the not-to-be-cleaned object that the cleaning device 100 should not inhale may include valuables, filth difficult to inhale (for example, excreta of companion animals), and human.

The cleaning device 100 according to an embodiment of the present disclosure may sense at least one object within the area to be cleaned by using the at least one sensor included in the cleaning device 100.

Examples of a method, performed by the cleaning device 100, of sensing the at least one object may include various methods such as a method of photographing the at least one object by using a camera, and a method of sensing collision with the at least one object by using a collision detection sensor. This will be described in greater detail with reference to FIG. 9.

In operation 220, the cleaning device 100 according to an embodiment of the present disclosure identifies a relative location of the sensed at least one object with respect to the cleaning device 100.

The cleaning device 100 according to an embodiment of the present disclosure may identify a location of the at least one object within the area to be cleaned, based on a map of the area to be cleaned. For example, the cleaning device 100 may obtain the map of the area to be cleaned, based on an external input or information sensed by the sensor. Then, the cleaning device 100 may identify a location of the sensed at least one object on the map of the area to be cleaned. For example, the cleaning device 100 may identify the coordinate of the sensed at least one object, based on a virtual coordinate system of the map of the area to be cleaned. For example, the coordinate of the at least one object may be one point, or may be a group of the coordinates of an area occupied by the at least one object in the virtual coordinate system of the area to be cleaned.

In addition, the cleaning device 100 according to an embodiment of the present disclosure may identify a relative location of the at least one object with respect to the cleaning device 100. For example, the cleaning device 100 may identify the orientation or height of a location of an object with respect to the cleaning device 100, or a distance from the cleaning device 100 to the object. For example, the cleaning device 100 may identify a relative location of the object by analyzing data obtained by sensing the surroundings of the cleaning device 100 through the sensor. For example, the cleaning device 100 may identify whether the at least one object is located on the right side or the front side of the cleaning device 100 or in a diagonal direction from the cleaning device 100.

The cleaning device 100 according to an embodiment of the present disclosure may identify a location or relative location of the sensed at least one object within the area to be cleaned, based on a direction in which the cleaning device 100 is currently moving or a direction in which the cleaning device 100 has moved before sensing the at least one object. For example, the cleaning device 100 may identify an angle between a virtual line representing a direction in which the cleaning device is currently moving or has moved, and a virtual line connecting the center of the cleaning device 100 to a location of the sensed at least one object. The angle therebetween may not be a specific single angle but may be a range of angles.

The cleaning device 100 according to an embodiment of the present disclosure may identify its own location.

The cleaning device 100 according to an embodiment of the present disclosure may identify its own location, based on the map of the area to be cleaned. For example, the cleaning device 100 may obtain map information of the area to be cleaned, based on an external input or information sensed by the sensor. Then, the cleaning device 100 may identify its own location on the map information of the area to be cleaned. For example, the cleaning device 100 may identify its own coordinate, based on the virtual coordinate system of the map of the area to be cleaned. For example, the coordinate of the cleaning device 100 may be one point, or may be a group of the coordinates of an area occupied by the cleaning device 100 in the virtual coordinate system of the area to be cleaned.

Also in operation 220, the cleaning device 100 according to an embodiment of the present disclosure may receive, from an external apparatus, information about the location of the cleaning device 100 in the area to be cleaned and the location of the at least one object included in the area to be cleaned, and identify the locations of the cleaning device 100 and the at least one object, based on the received information. The external apparatus may be, but is not limited to, a server, a camera that photographs the area to be cleaned, or a mobile device.

In operation 230, the cleaning device 100 according to an embodiment of the present disclosure determines at least a partial area within the entire area of a suction port, as an open/close target area, based on the identified relative location of the at least one object.

When the relative location of the at least one object is identified based on the location of the cleaning device 100, the relative location of the at least one object may also be identified based on the location of the suction port 110 within the cleaning device 100.

Then, the cleaning device 100 may determine at least a partial area within the entire area of the suction port 110, as an open/close target area, based on the identified relative location of the at least one object. The cleaning device 100 may also determine an open/close degree of the open/close target area, based on the location of the cleaning device 100 and the location of the at least one object.

In operation 240, the cleaning device 100 according to an embodiment of the present disclosure opens or closes the open/close target area.

The cleaning device 100 may open or close the open/close target area determined in operation 240 within the entire area of the suction port 110, by controlling the driver. The cleaning device 100 may also open or close the open/close target area according to the open/close degree determined in operation 240.

The order of operations 210 through 240 shown in FIG. 2 is not limited to the order of FIG. 2 but may vary. Operations 210 through 240 will now be described in detail with reference to the accompanying drawings.

FIG. 3 is a view for explaining a method, performed by a cleaning device according to an embodiment of the present disclosure, of controlling a suction port within the cleaning device.

The cleaning device 300 according to an embodiment of the present disclosure determines at least a partial area within the entire area of a suction port 310 within the cleaning device 300, as an open/close target area, based on a location of the cleaning device 300 and a location of at least one object. Then, the cleaning device 300 opens or closes the determined open/close target area by controlling a driver.

301 of FIG. 3 illustrates an example where the suction port 310 in the cleaning device 300 is entirely open and the entire area of the suction port 310 is divided into three areas. In the aforementioned example, the three areas may be virtually split areas or may be physically split areas. The cleaning device 300 may determine an area corresponding to a portion indicated by diagonal lines in 302 of FIG. 3 within the entire area of the suction port 310, as the open/close target area. Then, the cleaning device 300 opens or closes the determined open/close target area by controlling a driver. Referring to 302 of FIG. 3, the portion indicated by diagonal lines indicates that the determined open/close target area is closed. Hereinafter, similar to 302 of FIG. 3, a closed area within the entire surface of a suction port within a cleaning device will be indicated by diagonal lines.

The cleaning device 300 according to an embodiment of the present disclosure may determine an open/close degree of the open/close target area, based on the location of the cleaning device 300 and the location of the at least one object, and may open or close the open/close target area according to the determined open/close degree by controlling the driver. Referring to 303 of FIG. 3, the cleaning device 300 may determine all of the three split areas of the suction port 310 shown in 301 of FIG. 3 as the open/close target area, and then may determine respective open/close degrees of the three split areas, thereby opening or closing the open/close target area according to the determined open/close degrees. In 303 of FIG. 3, according to the aforementioned example, the cleaning device 300 closes the entirety or a portion of each of the three split areas.

FIG. 3 illustrates an example in which the cleaning device 300 determines at least a partial area within the entire area of the suction port 310 within the cleaning device 300 as the open/close target area, but FIG. 3 may be changed to various forms. For example, the suction port 310 within the cleaning device 300 may be split into an arbitrary number of areas or may not be split. For example, the at least partial area of the suction port 310 within the cleaning device 300, which is determined as the open/close target area, may have any shape. For example, the location and shape of the suction port 310 within the cleaning device 300 may be different from those shown in FIG. 3.

For convenience of explanation, FIG. 3 illustrates only an operation, performed by the cleaning device 300 according to an embodiment of the present disclosure, of determining and opening/closing the open/close target area. A method, performed by the cleaning device 300, of determining the open/close target area, based on the location of the cleaning device 300 and the location of the at least one object, will now be described in detail with reference to the accompanying drawings.

FIGS. 4A and 4B are views for explaining a plurality of partitions for opening and closing a suction port in a cleaning device according to an embodiment of the present disclosure, and a method in which the plurality of partitions open and close the suction port.

The cleaning device 400 according to an embodiment of the disclosure may include a plurality of partitions 412, 414, and 416 for opening and closing a suction port 410. The cleaning device 400 may open and close an open/close target area by moving at least one partition for opening and closing the open/close target area from among the plurality of partitions 412, 414, and 416, by controlling a driver.

According to an embodiment of the present disclosure, the plurality of partitions 412, 414, and 416 may be provided around the suction port 410 in the cleaning device 400 and may be used to open and close the suction port 410. FIG. 4A illustrates an example in which the three partitions 412, 414, and 416 are included in the cleaning device 400. Referring to FIG. 4A, portions indicated by diagonal lines represent the plurality of partitions 412, 414, and 416. Portions indicated by dotted lines indicate that the plurality of partitions 412, 414, and 416 are provided within the cleaning device 400 and thus are not seen from the bottom surface of the cleaning device 400. FIG. 4A only illustrates an example where the plurality of partitions 412, 414, and 416 are provided in the cleaning device 400, and the installation form of the plurality of partitions 412, 414, and 416 is not limited to the example of FIG. 4A. For example, in contrast with FIG. 4A, the plurality of partitions 412, 414, and 416 included in the cleaning device 400 may be provided outside the cleaning device 400, namely, at a location seen from the bottom surface of the cleaning device 400.

Similar to FIG. 4A, a closed area within the entire area of a suction port within a cleaning device being indicated by diagonal lines may represent a plurality of partitions included in the cleaning device.

Referring to FIG. 4A, according to an embodiment of the present disclosure, the plurality of partitions 412, 414, and 416 may move vertically with respect to the suction port 410 and may open and close at least a partial area of the suction port 410. According to an embodiment of the present disclosure, the plurality of partitions 412, 414, and 416 may be provided in the cleaning device 400 so as to move in a direction determined based on a movement direction 404 of the cleaning device 400.

The movement direction 404 of the cleaning device 400 according to an embodiment of the present disclosure may be perpendicular to a direction in which the suction port 410 is provided. For example, referring to FIG. 4A, when a virtual x-y coordinate axis 402 is drawn from the center of the cleaning device 400, based on a location where the suction port 410 is provided, a longer side of the suction port 410 may be parallel to an x axis, and the movement direction 404 of the cleaning device 400 may be parallel to a y axis. The cleaning device 400 according to an embodiment of the present disclosure may determine a direction to move at least one partition from among the plurality of partitions 412, 414, and 416, based on the movement direction 404 of the cleaning device 400, and may open and close the open/close target area by moving the at least one partition in the determined direction. For example, the cleaning device 400 may move the plurality of partitions 412, 414, and 416 in a direction substantially parallel to the movement direction 404 of the cleaning device 400.

FIG. 4A illustrates a plurality of partitions for opening and closing the suction port 410 within the cleaning device 400 according to an embodiment of the present disclosure, and an example in which the plurality of partitions open and close the suction port 410. However, the plurality of partitions of FIG. 4A may be changed to various forms. For example, the cleaning device 400 may include an arbitrary number of partitions, and a direction in which each of the partitions moves with respect to the suction port 410 may not be a vertical direction. For convenience of explanation, wheels are omitted from cleaning devices in the accompanying drawings below.

Some of various examples of a plurality of partitions according to an embodiment of the present disclosure are illustrated in FIG. 4B. Referring to 421 of FIG. 4B, a plurality of partitions may be provided in the cleaning device 400 so as to move in a direction oblique to the direction in which the suction port 410 is provided. Referring to 422 of FIG. 4B, a plurality of partitions may be provided on the upper side of the suction port 410. Referring to 423 of FIG. 4B, some of a plurality of partitions may be provided in the cleaning device 400 so as to move in a horizontal direction with respect to the suction port 410. Referring to 424 of FIG. 4B, one of a plurality of partitions may be provided on the upper side of the suction port 410, and another partition may be provided on the lower side of the suction port 410. Referring to 425 of FIG. 4B, some of a plurality of partitions may be provided on the upper side of the suction port 410, and the other partitions may be provided on the lower side of the suction port 410. Referring to 426 of FIG. 4B, some of the plurality of partitions may be provided in the cleaning device 400 to move horizontally with respect to the suction port 410, and the shapes of the suction port 410 and the plurality of partitions may include curves as shown in 426.

For convenience of explanation, the location and shape of a suction port will now be described on the premise of an example as shown in FIG. 3. In other words, a description is made on the premise that the suction port is located at a front portion of the bottom surface of a cleaning device and has a rectangular shape having a longer axis and a shorter axis.

Figure 5:
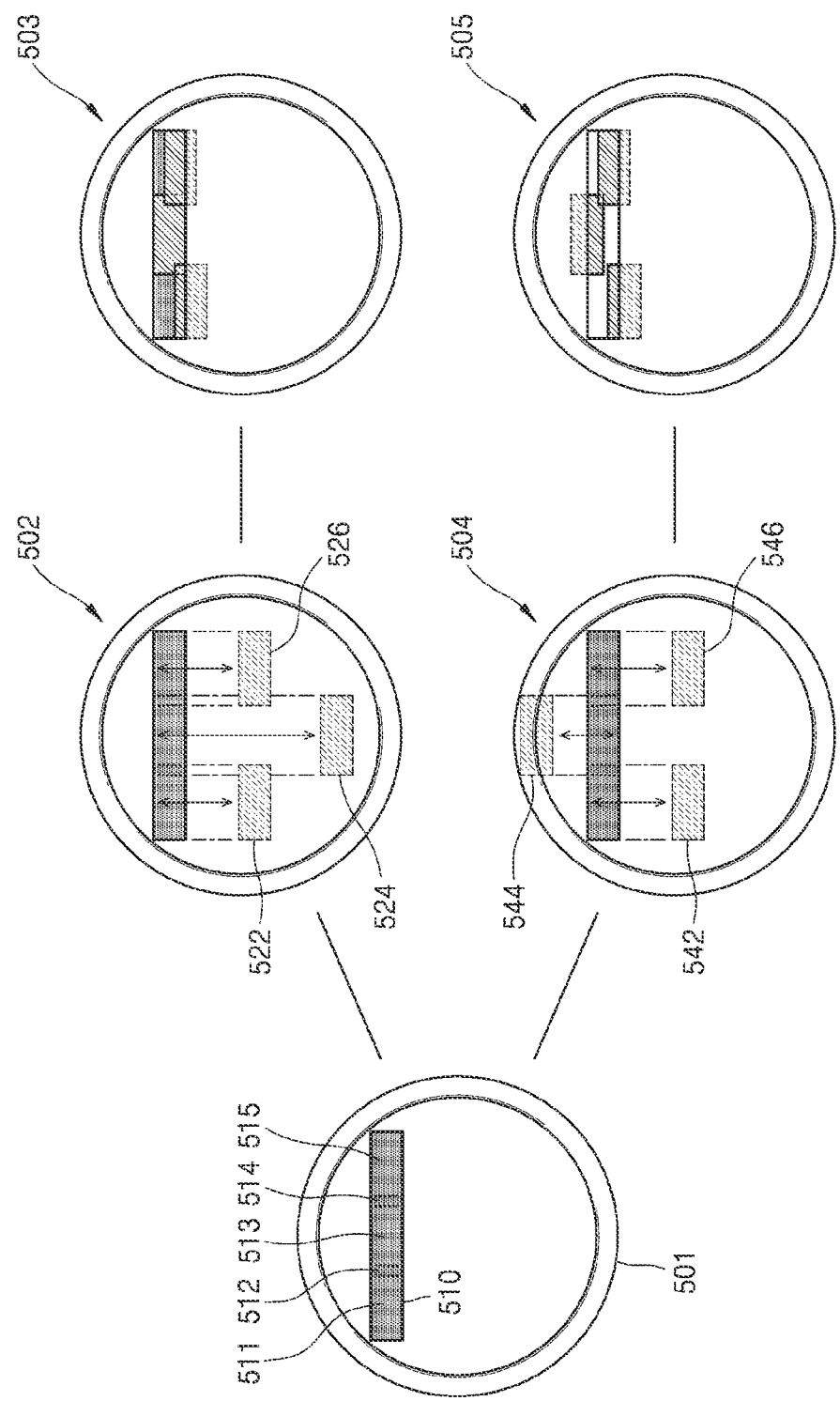
FIG. 5 is a view for explaining a method, performed by a plurality of partitions included in a cleaning device according to an embodiment of the present disclosure, of opening and closing areas into which a suction port within the cleaning device is split.

FIG. 5 is a view for explaining a method, performed by a plurality of partitions included in a cleaning device according to an embodiment of the present disclosure, of opening and closing areas into which a suction port within the cleaning device is split.

In the cleaning device 501 according to an embodiment of the present disclosure, the entire area of a suction port may be split into a plurality of areas, the plurality of areas may include a first split area, a second split area, and a third split area, and the first split area, the second split area, and the third split area may be adjacent to each other. A first partition from among the plurality of partitions included in the cleaning device 501 may move to open and close the first split area and the second split area, and a second partition from among the plurality of partitions may move to open and close the second split area and the third split area.

Referring to FIG. 5, for example, the entire area of a suction port 510 of the cleaning device 501 may be split into five areas 511 through 515. The five areas 511 through 515 may include a first split area 511, a second split area 512, and a third split area 513. The first split area 511, the second split area 512, and the third split area 513 may be adjacent to each other. A first partition 522 from among a plurality of partitions 522, 524, and 526 included in the cleaning device 501 may move to open and close the first split area 511 and the second split area 512, and a second partition 524 from among the plurality of partitions 522, 524, and 526 may move to open and close the second split area 512 and the third split area 513. In other words, areas respectively opened or closed by the plurality of partitions within the entire area of the suction port 510 may overlap each other. In this case, the plurality of partitions may be provided at different heights from the bottom surface of the cleaning device 501 so as to open and close the split areas of the suction port 510 without colliding with one another. An example in which the plurality of partitions 522, 524, and 526 open and close the split areas of the suction port 510 is indicated by 503 and 505 of FIG. 5.

Figure 6B:
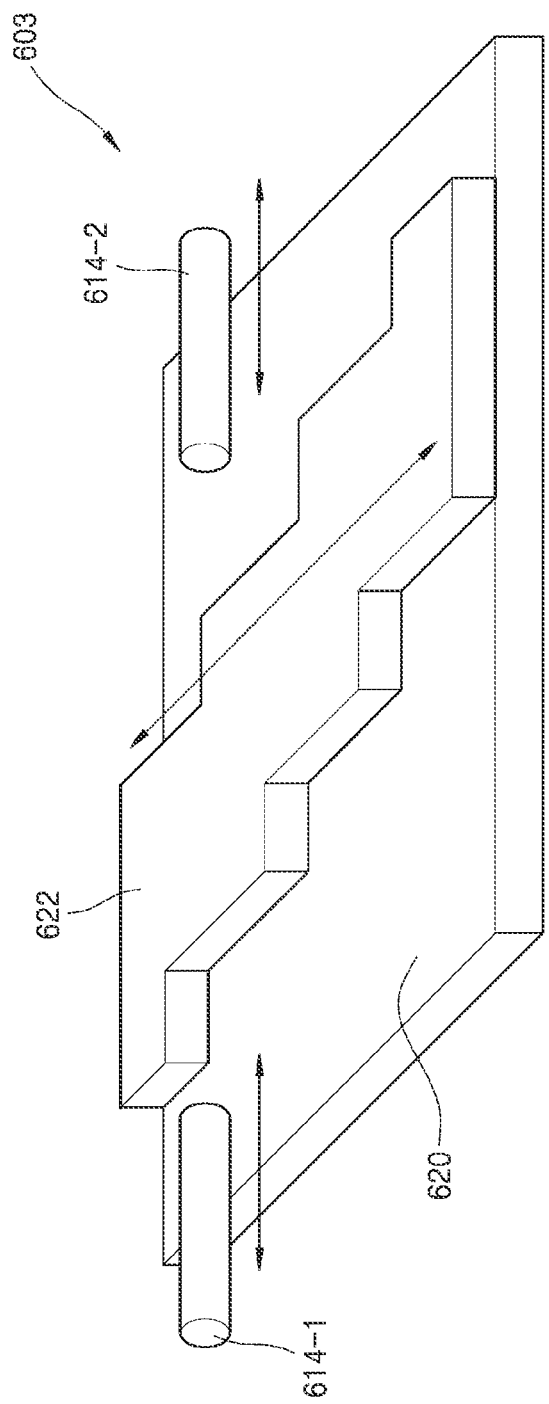
Figure 6C:
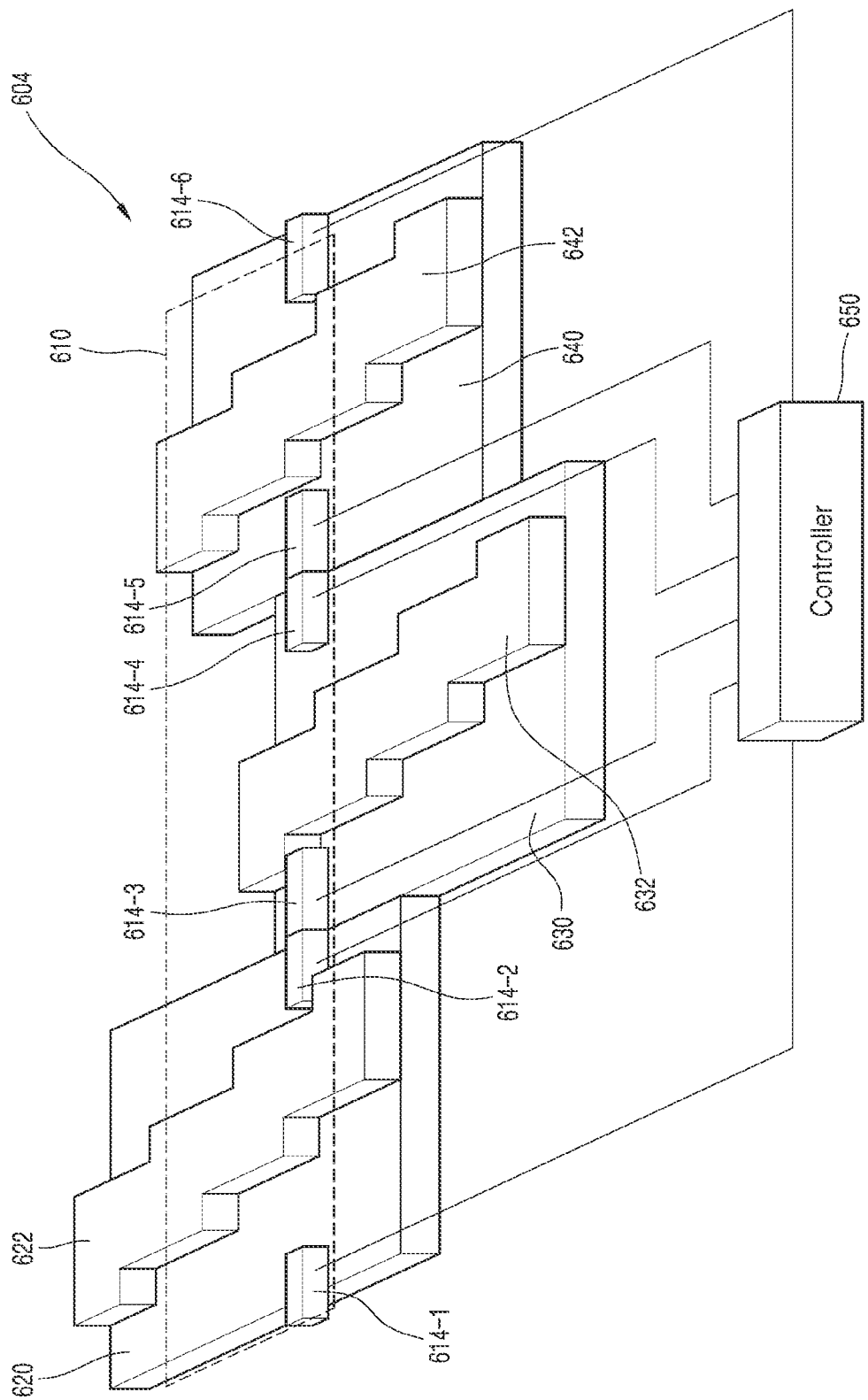

FIGS. 6A through 6C are views for explaining a method, performed by a cleaning device according to an embodiment of the present disclosure, of controlling a movement of at least one partition by controlling rotation of a brush.

The cleaning device 600 according to an embodiment of the present disclosure may include a plurality of partitions 620, 630, and 640 of FIG. 6C, and may include a brush 612 provided in a suction port 610 and contacting the plurality of partitions 620, 630, and 640. The cleaning device 600 may control a movement of at least one partition that contacts the rotating brush 612, by controlling rotation of the brush 612.

For example, the brush 612 may perform an operation of sweeping a to-be-cleaned object located in an area to be cleaned into the cleaning device 600 through the suction port 610, by rotating under the control of the cleaning device 600. The brush 612 may adjoin the plurality of partitions 620, 630, and 640. Accordingly, when the brush 612 rotates, a frictional force may be generated at portions where the plurality of partitions 620, 630, and 640 contact the brush 612. The cleaning device 600 may control movements of the plurality of partitions 620, 630, and 640 by rotating the brush 612, by using the frictional force generated between the brush 612 and the plurality of partitions 620, 630, and 640. For example, the cleaning device 600 may rotate the brush 612 in a clockwise direction or counterclockwise direction as viewed from the left side of the cleaning device 600 (see 601).

The shape of a partition according to an embodiment of the present disclosure may be the shape shown in FIG. 6B. Referring to FIG. 6B, the partition 620 may have a two-layered structure. A lower portion of the partition 620 may be located on the side of the bottom surface of the cleaning device 600, and an upper portion 622 of the partition 620 may be located in a direction toward the inside of the cleaning device 600. In other words, a portion of the partition 620 that contacts the brush 612 may be the upper portion 622. The brush 612 may cause friction with the upper portion 622 of the partition 620, which is in contact with the brush 610, by rotating, and may move the partition 620 vertically according to a rotation direction of the brush 612. Due to the vertical movement of the partition 620, the suction port 610 of the cleaning device 600 may be opened or closed.

For example, a structure of the upper portion 622 of the partition 620 may be an angled structure as shown in FIG. 6B. In the cleaning device 600, fixing units 614-1 and 614-2 for controlling a movement degree of the partition 620 may be provided on right and left portions of the partition 620, around the suction port 610. The fixing units 614-1 and 614-2 may control the degree of a vertical movement of the partition 620 due to rotation of the brush 612, by extending toward or shortening from the upper portion 622 of the partition 620.

For example, a method of controlling the brush 612 and the fixing units 614-1 and 614-2 when the cleaning device 600 closes at least a partial area of the suction port 610 by moving the partition 620 upwards is as follows. The cleaning device 600 may move the partition 620 upwards by shortening a second fixing unit 614-2 to the right and rotating the brush 612 in a clockwise direction as viewed from the left side of the cleaning device 600 (see 601 of FIG. 6A). Then, the cleaning device 600 may fix the partition 620 to prevent a vertical movement of the partition 620 even when the rotation direction of the brush 612 is changed to an opposite direction (i.e., a counterclockwise direction), by extending a first fixing unit 614-1 to the right. For example, a method of controlling the brush 612 and the fixing units 614-1 and 614-2 when the cleaning device 600 opens at least a partial area of the suction port 610 by moving the partition 620 downwards may be an opposite method to the above-described method. In other words, the cleaning device 600 may move the partition 620 downwards by shortening the first fixing unit 614-1 to the left and rotating the brush 612 in a counterclockwise direction as viewed from the left side of the cleaning device 600 (see 601 of FIG. 6A). Then, the cleaning device 600 may fix the partition 620 to prevent a vertical movement of the partition 620 even when the rotation direction of the brush 612 is changed to an opposite direction (i.e., a counterclockwise direction), by extending the second fixing unit 614-2 to the left. For example, the cleaning device 600 may control a vertical movement degree of the partition 620 by changing locations on angled portions of the upper portion 622 of the partition 620 that the fixing units 614-1 and 614-2 respectively contact, by controlling degrees to which the fixing units 614-1 and 614-2 extend or shorten, respectively. The cleaning device 600 may control the degree to which a partial area of the suction port 610 is opened or closed, by controlling the vertical movement degree of the partition 620.

An example of the cleaning device 600 including the partitions 630 and 640 having the same shapes as the partition 620 described above with reference to FIG. 6B and fixing units 614-3 through 614-6 having the same shapes as the fixing units 614-1 and 614-2 described above with reference to FIG. 6B is illustrated in FIG. 6C. Referring to FIG. 6C, the cleaning device 600 may include a controller 650 in a driver. The controller 650 may control degrees to which the fixing units 614-1 through 614-6 extend or shorten in a horizontal direction, respectively. The cleaning device 600 may control the degree to which each of the plurality of partitions 620, 630, and 640 opens or closes the suction port 610, by controlling the rotation direction of the brush 612 and extension and shortening of the fixing units 614-1 through 614-6.

FIGS. 7 and 8 are views for explaining a method, performed by a cleaning device according to an embodiment of the present disclosure, of opening or closing an open/close target area of a suction port by moving a plurality of partitions by controlling a driver.

Referring to FIG. 7, the cleaning device may include a controller 720 and a plurality of motors 714-1 through 714-3. The plurality of motors 714-1 through 714-3 may control a plurality of partitions 712-1 through 712-3 to move in a vertical direction, respectively. The controller 720 may control degrees to which the plurality of partitions 712-1 through 712-3 open or close a suction port 710, respectively, by controlling the plurality of motors 714-1 through 714-3.

Referring to FIG. 8, the cleaning device may include a controller 820 and a plurality of motors 814-1 through 814-3. The plurality of motors 814-1 through 814-3 may control a plurality of partitions 812-1 through 812-3 to pivot on an upper portion of a suction portion 810, respectively. In other words, the plurality of partitions 812-1 through 812-3 may open or close the suction port 810 by pivoting. An axis about which the plurality of partitions 812-1 through 812-3 pivot may have a hinge structure. The controller 820 may control degrees to which the plurality of partitions 812-1 through 812-3 open or close the suction port 810, respectively, by controlling the plurality of motors 814-1 through 814-3.

Figure 9:
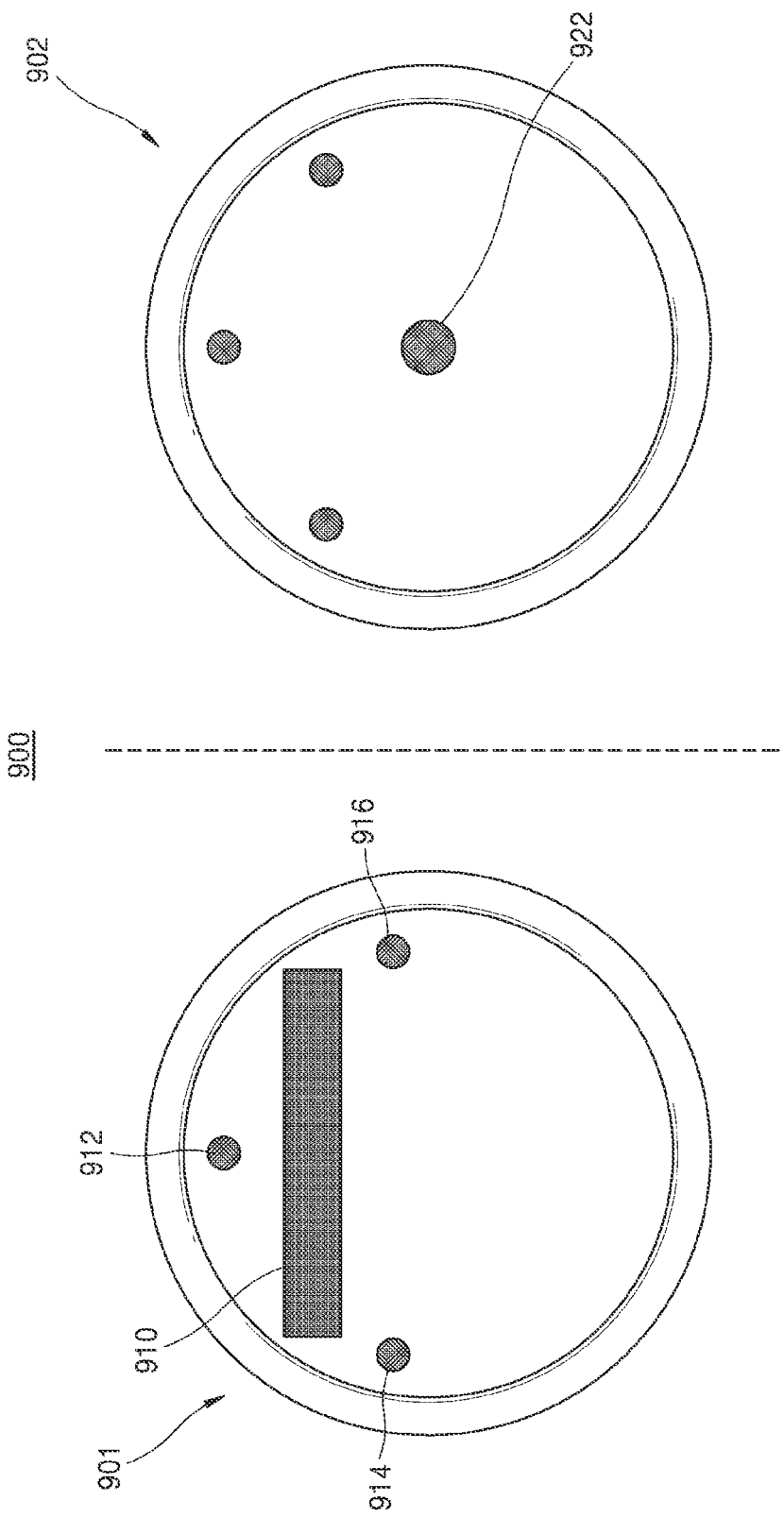
FIG. 9 is a view for explaining at least one sensor included in a cleaning device according to an embodiment of the present disclosure.

FIG. 9 is a view for explaining at least one sensor included in a cleaning device according to an embodiment of the present disclosure.

The cleaning device 900 according to an embodiment of the present disclosure includes at least one sensor that senses at least one object within an area to be cleaned by the cleaning device 900. Referring to FIG. 9, the cleaning device 900 may include one or more sensors 912, 914, and 916 on a bottom surface 901 of the cleaning device 900, and may include one or more sensors 922, 924, 926, and 928 on a top surface 902 of the cleaning device 900.

The at least one sensor included in the cleaning device 900 according to an embodiment of the present disclosure may include at least one of at least one RGB camera, at least one mono/stereo vision camera, at least one Light Detection And Ranging (LIDAR), at least one Radio Detection And Ranging (RADAR), at least one ultrasonic sensor, at least one infrared sensor, at least one collision detection sensor, at least one inclination detection sensor, at least one acceleration sensor, and at least one gyroscopic sensor. The at least one sensor included in the cleaning device 900 may sense at least one of the shape, location, or type of the at least one object within the area to be cleaned by the cleaning device 900. The at least one sensor may also sense whether the cleaning device 900 has collided with the at least one object. The at least one sensor may also sense an inclination of the cleaning device 900.

For example, the cleaning device 900 according to an embodiment of the present disclosure may include at least one RGB camera or at least one mono/stereo vision camera. The cleaning device 900 may sense at least one of the shape, location, or type of the at least one object by photographing the area to be cleaned and the at least one object by using a camera.

For example, the cleaning device 900 according to an embodiment of the present disclosure may include at least one LIDAR, at least one RADAR, at least one ultrasonic sensor, or at least one infrared sensor. The LIDAR is a method or apparatus for measuring the location, speed, or the like of an object by radiating light to the object and measuring light reflected by the object. The LIDAR is generally used to make a high-resolution map, and is for use in not only topography researches but also control and navigation of autonomous vehicles. The cleaning device 900 according to an embodiment of the present disclosure may generate high-resolution information about the area to be cleaned and the at least one object included in the area to be cleaned, based on topography of the area to be cleaned sensed by the LIDAR and the at least one object included in the area to be cleaned sensed by the LIDAR.

For example, the cleaning device 900 according to an embodiment of the present disclosure may include a collision detection sensor, and may sense whether the cleaning device 900 has collided with the at least one object, by using the collision detection sensor.

For example, the cleaning device 900 according to an embodiment of the present disclosure may include an inclination detection sensor, an acceleration sensor, or a gyroscopic sensor, and may sense whether the cleaning device 900 has been inclined or an angle at which the cleaning device 900 is inclined, by using the inclination detection sensor, the acceleration sensor, or the gyroscopic sensor.

According to an embodiment of the present disclosure, the sensor 922 from among the sensors of the cleaning device 900 may be LIDAR. The LIDAR may be provided at the center of the upper portion of the cleaning device 900 to effectively sense the area to be cleaned by the cleaning device 900. However, this is merely an example, and a location of the LIDAR on the cleaning device 900 according to an embodiment of the present disclosure is not limited to the location of the sensor 922 of FIG. 9. For example, the LIDAR may be provided on a front side portion of the cleaning device 900, namely, on a portion 924 of FIG. 9.

The cleaning device 900 according to an embodiment of the present disclosure may sense the area to be cleaned by the cleaning device 900 by controlling at least one sensor provided on the top surface 902 of the cleaning device 900, and may sense at least one object located below the cleaning device 900 by controlling at least one sensor provided on the bottom surface 901 of the cleaning device 900.

FIG. 9 only illustrates an example in which at least one sensor is provided on the cleaning device 900. The form in which at least one sensor is provided is not limited thereto. For example, the locations where the one or more sensors 912, 914, 916, 922, 924, 926, and 928 are respectively provided, and the number of sensors 912, 914, 916, 922, 924, 926, and 928 may be different from those shown in FIG. 9.

The cleaning device 900 according to an embodiment of the present disclosure may identify at least one object by using an image processing technique or a pre-generated learning network model, based on information obtained by controlling at least one sensor. For example, the cleaning device 900 may identify the location, shape, or type of the at least one object, and may ascertain whether the at least one object is a to-be-cleaned object or a not-to-be-cleaned object. This will now be described in greater detail with reference to the accompanying drawings.

Figure 10:
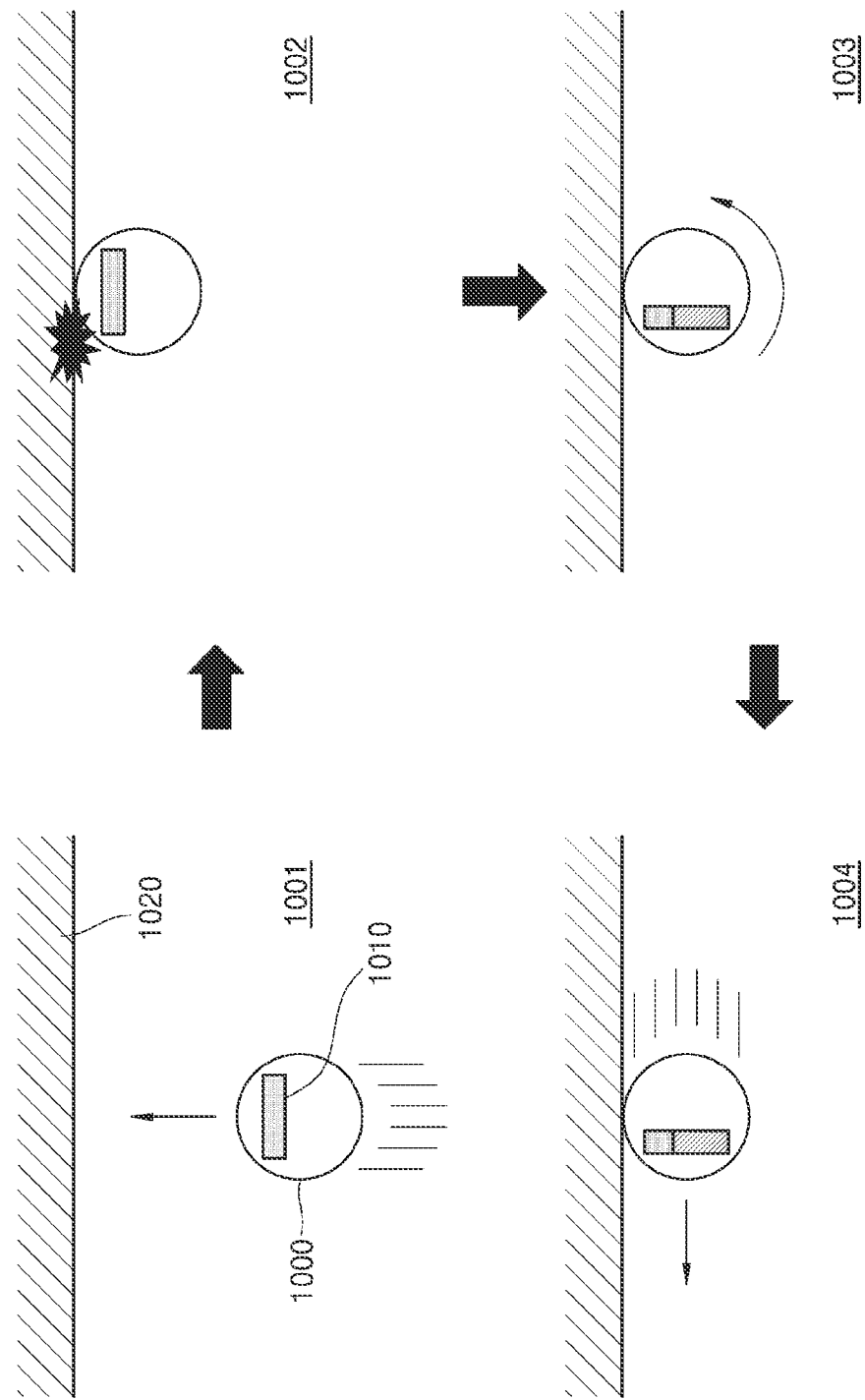
FIG. 10 is a view for explaining a method, performed by a cleaning device according to an embodiment of the present disclosure, of determining an open/close target area of a suction port when the cleaning device identifies an object that blocks movement of the cleaning device.

FIG. 10 is a view for explaining a method, performed by a cleaning device according to an embodiment of the present disclosure, of determining an open/close target area of a suction port when the cleaning device identifies an object that blocks a movement of the cleaning device.

Referring to 1001 of FIG. 10, the cleaning device 1000 according to an embodiment of the present disclosure is moving upwards while cleaning an area to be cleaned, and the entire area of a suction port 1010 within the cleaning device 1000 is open. An object 1020 that blocks movement of the cleaning device 1000 exists in a movement direction of the cleaning device 1000. For example, the object 1020 may be a wall, a furniture, or a home appliance, but the present disclosure is not limited thereto. An example in which the object 1020 toward which the cleaning device 1000 moves is a wall will now be illustrated.

The cleaning device 1000 according to an embodiment of the present disclosure may sense at least one object within the area to be cleaned by the cleaning device 1000. Referring to 1001 of FIG. 10, the cleaning device 1000 may sense the wall 1020 within the area to be cleaned. A method, performed by the cleaning device 1000, of sensing the wall 1020, which is at least one object within the area to be cleaned, through a sensor has been described above in detail with reference to FIG. 9.

The cleaning device 1000 according to an embodiment of the present disclosure identifies a relative location of the sensed wall 1020 with respect to the cleaning device 1000. The cleaning device 1000 may identify a location of the sensed wall 1020 within the area to be cleaned. The cleaning device 1000 may also identify its own location within the area to be cleaned. For example, the cleaning device 1000 may obtain a map of the area to be cleaned, based on an external input or information sensed by the sensor. Then, the cleaning device 1000 may identify respective locations of the sensed wall 1020 and the cleaning device 1000 on the map of the area to be cleaned. For example, the cleaning device 1000 may identify respective coordinates of the sensed wall 1020 and the cleaning device 1000, based on a virtual coordinate system of the area to be cleaned. For example, the coordinate of each of the sensed wall 1020 and the cleaning device 1000 may be one point, or may be a group of the coordinates of an area occupied by each of the sensed wall 1020 and the cleaning device 1000 in the virtual coordinate system of the area to be cleaned.

For example, the location of the cleaning device 1000 within the area to be cleaned may include an angle at which the cleaning device 1000 is rotated, based on the virtual coordinate system of the area to be cleaned. For example, the angle at which the cleaning device 1000 is rotated may refer to an angle at which a coordinate axis of the cleaning device 1000 is rotated, based on the virtual coordinate system of the area to be cleaned. For example, as shown in FIG. 4A, the coordinate axis of the cleaning device 1000 may be an x-y coordinate axis that uses an axis parallel to the movement direction of the cleaning device 1000 as a y axis.

The cleaning device 1000 according to an embodiment of the present disclosure may identify a location of a suction port 1010 within the cleaning device 1000, based on the location of the cleaning device 1000. The method, performed by the cleaning device 1000, of identifying the location of the suction port 1010 may be the same as the above-described method of identifying the location of the cleaning device 1000. For example, the cleaning device 1000 may identify the coordinate of the suction port 1010, based on the virtual coordinate system of the area to be cleaned. For example, the cleaning device 1000 may identify an angle at which the suction port 1010 is rotated, based on the virtual coordinate system of the area to be cleaned.

The cleaning device 1000 according to an embodiment of the present disclosure may identify whether the sensed at least one object is an object that blocks movement of the cleaning device 1000.

In 1002 of FIG. 10, movement of the cleaning device 1000 is blocked by the wall 1020. For example, as shown in 1002, the cleaning device 1000 may collide with the wall 1020 and movement of the cleaning device 1000 may be blocked. For example, the cleaning device 1000 may sense whether the cleaning device 1000 has collided with the object 1020, through a collision detection sensor. When collision of the cleaning device 1000 with the object 1020 is sensed, the cleaning device 1000 may identify the object 1020 as an object that blocks movement of the cleaning device 1000.

For example, in contrast with 1002, the cleaning device 1000 may not collide with the wall 1020, may sense presence of the wall 1020 in the movement direction of the cleaning device 1000 through a sensor of the cleaning device 1000, and may identify whether the movement of the cleaning device 1000 is to be blocked by the wall 1020. For example, the cleaning device 1000 may sense presence of the wall 1020 in the movement direction of the cleaning device 1000 and identify whether the movement of the cleaning device 1000 is to be blocked by the wall 1020, by using at least one of at least one RGB camera, at least one mono/stereo vision camera, at least one LIDAR, at least one RADAR, at least one ultrasonic sensor, or at least one infrared sensor. When it is identified that movement of the cleaning device 1000 is blocked by the object 1020, the cleaning device 1000 may identify the object 1020 as an object that blocks movement of the cleaning device 1000.

When the sensed at least one object is identified as an object that blocks movement of the cleaning device 1000, the cleaning device 1000 according to an embodiment of the present disclosure may determine at least a partial area within the entire area of the suction port 1010 as an open/close target area, based on the location of the cleaning device 1000, a direction in which movement of the cleaning device 1000 is blocked, and a relative location of the at least one object with respect to the cleaning device 1000.

A suction force by which the cleaning device 1000 sucks a to-be-cleaned object is determined to be within a certain range according to an output of a fan motor included in a driver of the cleaning device 1000. In other words, a maximum suction force of the cleaning device 1000 when the suction port 1010 is completely open is determined constantly according to the output of the fan motor. However, the cleaning device 1000 according to an embodiment of the present disclosure may increase the suction force when the output of the fan motor is uniform, by reducing a cleaning target suction area of the suction port 1010 by closing at least a partial area of the suction port 1010.

There may be an object that blocks movement of the cleaning device 1000, within the area to be cleaned. In this case, an area between the cleaning device 1000 and an object, within the area to be cleaned, may have an area unable to be located below the suction port 1010. Because a to-be-cleaned object located in this area is far from the suction port 1010, it may be difficult for the cleaning target to be sucked into the cleaning device 1000. However, the cleaning device 1000 according to an embodiment of the present disclosure may open only a partial area close to an area to be cleaned unable to be located below the suction port 1010 within the entire area of the suction port 1010, and may close the remaining area, thereby increasing a suction force for sucking the to-be-cleaned object located in the area to be cleaned. For example, when the suction port 1010 is split into three areas, the cleaning device 1000 may open only one area close to the area to be cleaned from among the split areas of the suction port 1010 and may close the other areas, thereby increasing a suction force of the open area. The cleaning device 1000 may also open only a partial area close to an object that blocks movement of the cleaning device 1000, within the entire area of the suction port 1010, and may close the remaining area, thereby increasing a suction force for sucking the cleaning target located in the area to be cleaned.

The cleaning device 1000 may change a relative location of the object that blocks movement of the cleaning device 1000, with respect to the suction port 1010, by rotating. For example, due to rotation of the cleaning device 1000, the object that blocks movement of the cleaning device 1000, and the suction port 1010 may be positioned closer to each other. Then, the cleaning device 1000 may open only a partial area closest to the object that blocks movement of the cleaning device 1000, within the entire area of the suction port 1010, and may close the remaining area, thereby increasing a suction force of the open area.

As described above, the cleaning device 1000 may close or open at least a partial area of the suction port 1010 to increase a suction force of the open at least partial area, thereby effectively sucking a to-be-cleaned object located at a place where cleaning is difficult.

Referring to 1002 of FIG. 10, a direction in which movement of the cleaning device 1000 is blocked is a direction in which the cleaning device 1000 moves as indicated by 1001, namely, a direction in which the wall 1020 is placed. The cleaning device 1000 may identify a relative location of the wall 1020 with respect to the cleaning device 1000, based on the location of the cleaning device 1000 and the location of the wall 1020. Referring to 1002, the cleaning device 1000 may identify the wall 1020 as being located in front as viewed in a traveling direction of the cleaning device 1000. The cleaning device 1000 may also identify a relative location of the at least one object with respect to the location of the suction port 1010 of the cleaning device 1000, based on the relative location of the at least one object with respect to the cleaning device 1000. For example, the cleaning device 1000 may identify the relative location of the wall 1020 with respect to the location of the suction port 1010, based on the relative location of the wall 1020 with respect to the cleaning device 1000. For example, referring to 1002, the cleaning device 1000 may identify an area having the wall 1020 within the area to be cleaned as being parallel to a longer axis of the suction port 1010.

According to an embodiment of the present disclosure, the cleaning device 1000 may determine at least a partial area within the entire area of the suction port 1010 as the open/close target area, based on the location of the cleaning device 1000, the direction in which movement of the cleaning device 1000 is blocked, and the relative location of the wall 1020 with respect to the cleaning device 1000. For example, referring to 1002, the cleaning device 1000 may identify an area close to the wall 1020 within the entire area of the suction port 1010 as being an upper end portion of the suction port 1010. Referring to 1003, the cleaning device 1000 may identify that the wall 1020 and the suction port 1010 are positioned closer to each other when the cleaning device 1000 rotates by 90 degrees. Based on a result of the identification, the cleaning device 1000 may rotate 90 degrees from a state indicated by 1002, as shown in 1003, and may determine, as the open/close target area, at least a partial area of the entire area of the suction port 1010 that is far from the wall 1020. Then, the cleaning device 1000 may close the partial area within the entire area of the suction port 1010 determined as the open/close target area, and may maintain the remaining area close to the wall 1020 in an open state.

For example, a case where the cleaning device 1000 includes a plurality of partitions for opening and closing the suction port 1010 and the plurality of partitions are three partitions as described above with reference to FIG. 4A is described. In this case, the cleaning device 1000 may close the open/close target area of the suction port 1010 by moving two partitions for opening and closing the open/close target area, and may maintain the remaining area close to the wall 1020 within the entire area of the suction port 1010 in an open state by not moving the other partition. As described above, the cleaning device 1000 may increase a suction force for sucking to-be-cleaned objects existing in the area to be cleaned between the cleaning device 1000 and the wall 1020, by closing or opening at least a partial area of the suction port 1010 as shown in 1003.

Referring to 1004 of FIG. 10, the cleaning device 1000 may move along a surface of the wall 1020 while maintaining the open state of the suction port 1010 as a state as shown in 1003, thereby sucking to-be-cleaned objects existing in the area to be cleaned between the cleaning device 1000 and the wall 1020.

Figure 11A:
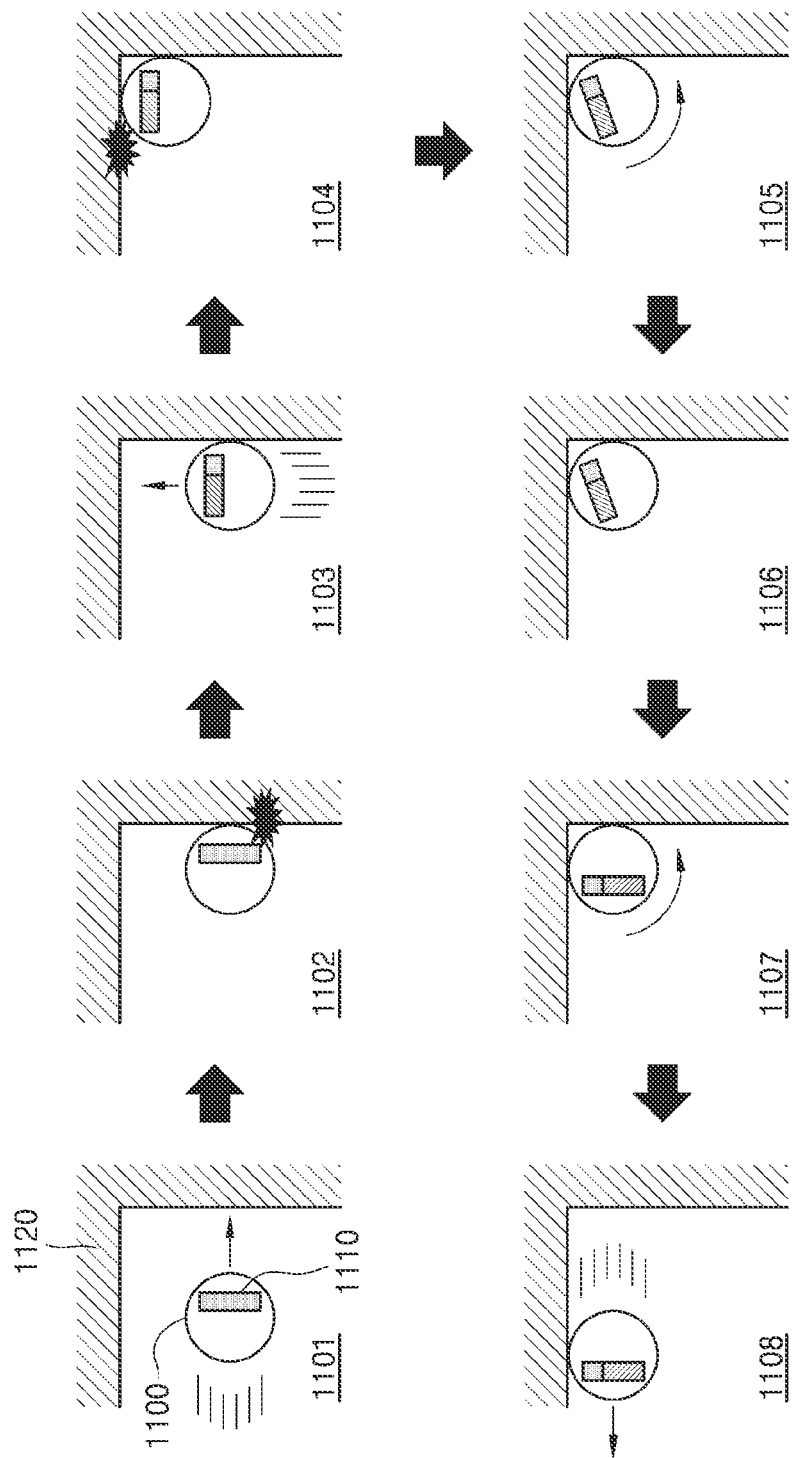
FIGS. 11A and 11B are views for explaining a method, performed by a cleaning device according to an embodiment of the present disclosure, of determining an open/close target area of a suction port when the cleaning device identifies an object that blocks movement of the cleaning device in two or more directions.
Figure 11B:
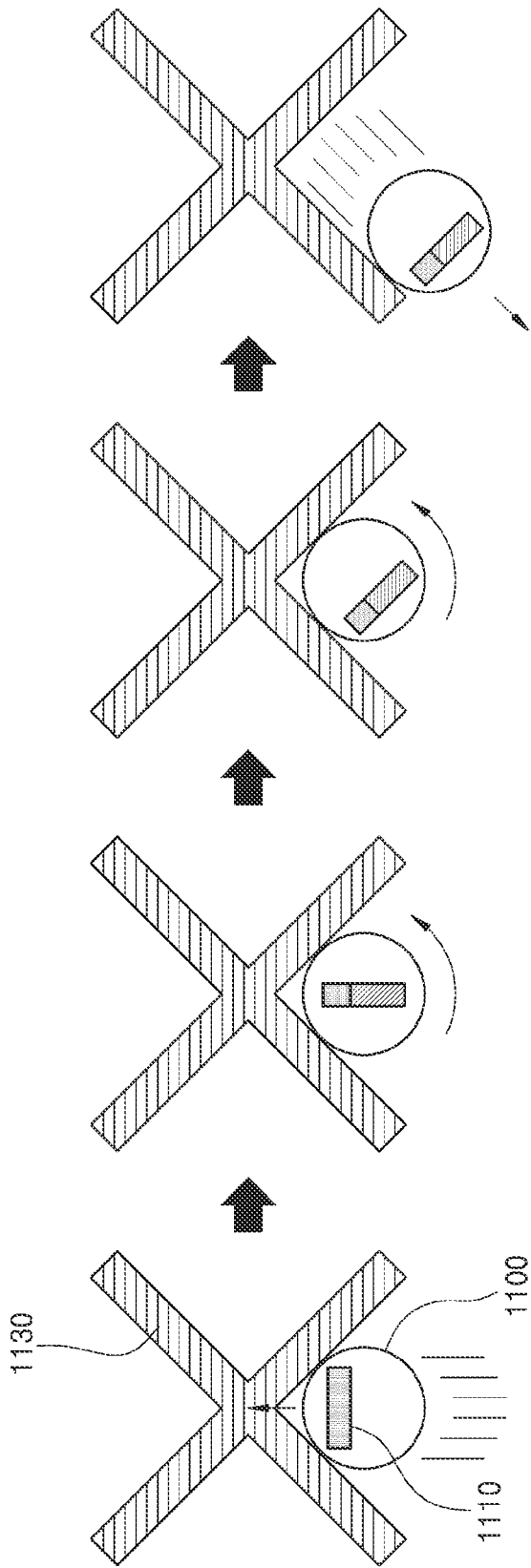

FIGS. 11A and 11B are views for explaining a method, performed by a cleaning device according to an embodiment of the present disclosure, of determining an open/close target area of a suction port when the cleaning device identifies an object that blocks a movement of the cleaning device in two or more directions.

According to an embodiment of the present disclosure, when at least one object within an area to be cleaned is identified as an object that blocks movement of the cleaning device 1100 in two or more directions, the cleaning device 1100 may determine an open/close target area of a suction port 1110, based on a direction in which movement of the cleaning device 1100 is blocked and a relative location of the at least one object with respect to the cleaning device 1100.

Referring to FIG. 11A, when the cleaning device 1100 identifies a wall 1120, which is an object that blocks movement of the cleaning device 1100 in a first direction (for example, rightwards), an operation of the cleaning device 1100 shown in 1101 through 1103 of FIG. 11A may be the same as that shown in 1001 through 1004 of FIG. 10. Then, referring to 1104 of FIG. 11A, the cleaning device 1100 may identify the wall 1120 as an object that blocks movement of the cleaning device 1100 in a second direction (for example, upwards). In other words, the cleaning device 1100 may identify the wall 1120 as an object that blocks movement of the cleaning device 1100 in the first direction and the second direction.

In this case, the object that blocks movement of the cleaning device 1100 may include a contact portion (for example, a vertex or corner portion of a wall or furniture; hereinafter, referred to as a corner portion) between a portion that blocks movement of the cleaning device 1100 in the first direction and a portion that blocks movement of the cleaning device 1100 in the second direction. Because a to-be-cleaned object located in an area to be cleaned (hereinafter, an in-between space) between the aforementioned corner portion and the cleaning device 1100 is far from the suction port 1110, it may be difficult for the cleaning target to be sucked into the cleaning device 1100.

However, the cleaning device 1100 according to an embodiment of the present disclosure may open only a partial area close to the aforementioned corner portion within the entire area of the suction port 1110 and close the remaining area so as to increase a suction force for sucking the cleaning target located between the aforementioned corner portion and the cleaning device 1100. A detailed method, performed by the cleaning device 1100, of effectively sucking a to-be-cleaned object located at a place where cleaning is difficult, by closing or opening at least a partial area of the suction port 1110 and increasing a suction force of the open at least partial area is the same as that described above with reference to FIG. 10.

Referring to 1105 of FIG. 11A, the cleaning device 1100 may identify that the corner portion of the wall 1120 and the suction port 1110 may be positioned closer to each other when the cleaning device 1100 rotates at a certain angle. Based on a result of the identification, the cleaning device 1100 may rotate at a certain angle from a state indicated by 1104, as shown in 1105, and may determine, as the open/close target area, at least a partial area far from the corner portion of the wall 1120 within the entire area of the suction port 1110. Then, the cleaning device 1100 may close the partial area within the entire area of the suction port 1110 determined as the open/close target area, and may maintain the remaining area close to the corner portion of the wall 1120 in an open state. When at least a partial area of the suction port 1110 has already been closed as shown in 1104, the cleaning device 1100 may suck a to-be-cleaned object located in a space between the cleaning device 1100 and the wall 1120, by only rotating without determining the open/close target area. Then, referring to 1106, the cleaning device 1100 may maintain the above-described rotation state of the cleaning device 1100 and the above-described open state of the suction port 1110 for a certain time period so as to suck the to-be-cleaned object located in the space between the cleaning device 1100 and the wall 1120.

Referring to 1107 and 1108 of FIG. 11A, the cleaning device 1100 may rotate at a certain angle from the state shown in 1106 and then move, in order to suck a to-be-cleaned object located between the portion of the wall 1120 that blocks movement of the cleaning device 1100 in the second direction (for example, upwards) and the cleaning device 1100. For example, the cleaning device 1100 may suck to-be-cleaned objects existing in the area to be cleaned between the cleaning device 1100 and the wall 1120, by moving along a surface of the wall 1120 while maintaining the open state of the suction port 1110 as states as shown in 1103 through 1108.

According to the aforementioned embodiments, the cleaning device 1100 may sense whether the cleaning device 1100 has collided with the wall 1120, and may perform rotation of the cleaning device 1100 and an open/close operation of the suction port 1110, based on sensed information. Alternatively, the cleaning device 1100 may perform rotation of the cleaning device 1100 and an open/close operation of the suction port 1110, based on topography information sensed through a sensor, without colliding with the wall 1120. For example, the cleaning device 1100 may obtain a map of the area to be cleaned by using at least one of at least one RGB camera, at least one mono/stereo vision camera, at least one LIDAR, at least one RADAR, at least one ultrasonic sensor, or at least one infrared sensor, and may determine a direction in which and an angle at which the cleaning device 1100 is to rotate, at least a partial area of the suction port 1120 as an open/close target area, and an open/close degree of the open/close target area, based on the obtained map. For example, referring to FIG. 11B, when the cleaning device 1100 senses an object 1130 having a corner portion within an area to be cleaned, the cleaning device 1100 may suck a to-be-cleaned object located between the object 1130 and the cleaning device 1100 by performing rotation of the cleaning device 1100 and an open/close operation of the suction port 1110 as described above with reference to FIG. 11A.

Figure 12A:
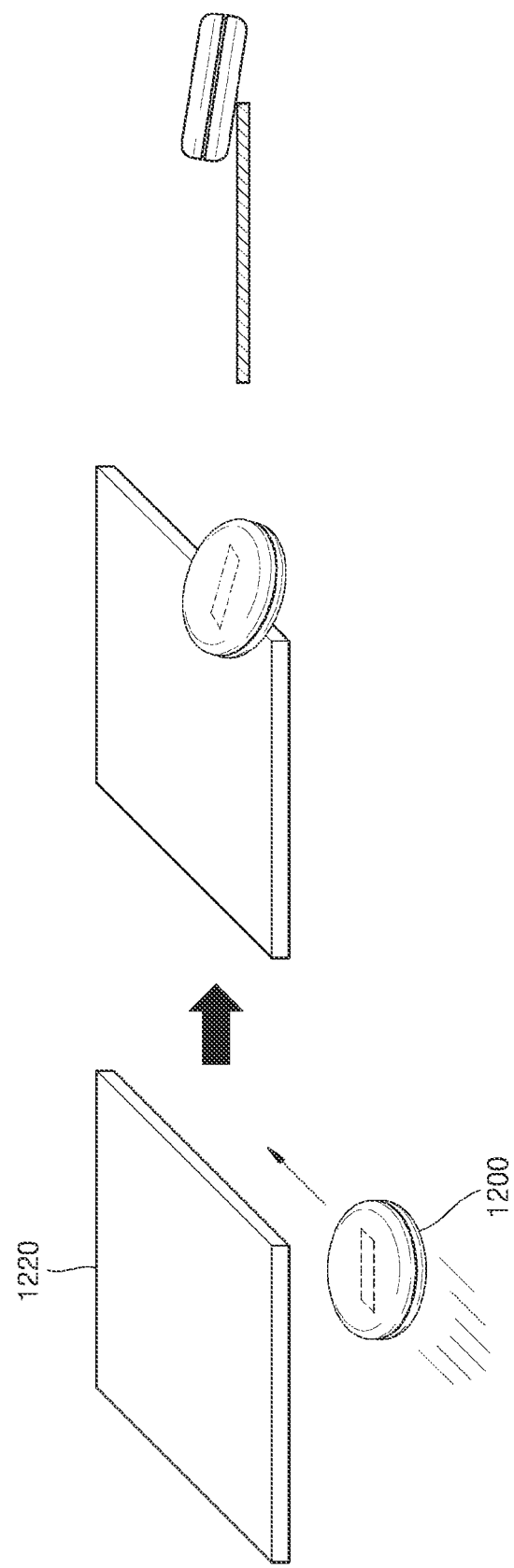
FIGS. 12A and 12B are views for explaining a method, performed by a cleaning device moving over at least one object according to an embodiment of the present disclosure, of determining an open/close target area of a suction port, based on the location of the at least one object located below the cleaning device, when an inclination of the cleaning device is changed to a preset angle or greater.
Figure 12B:
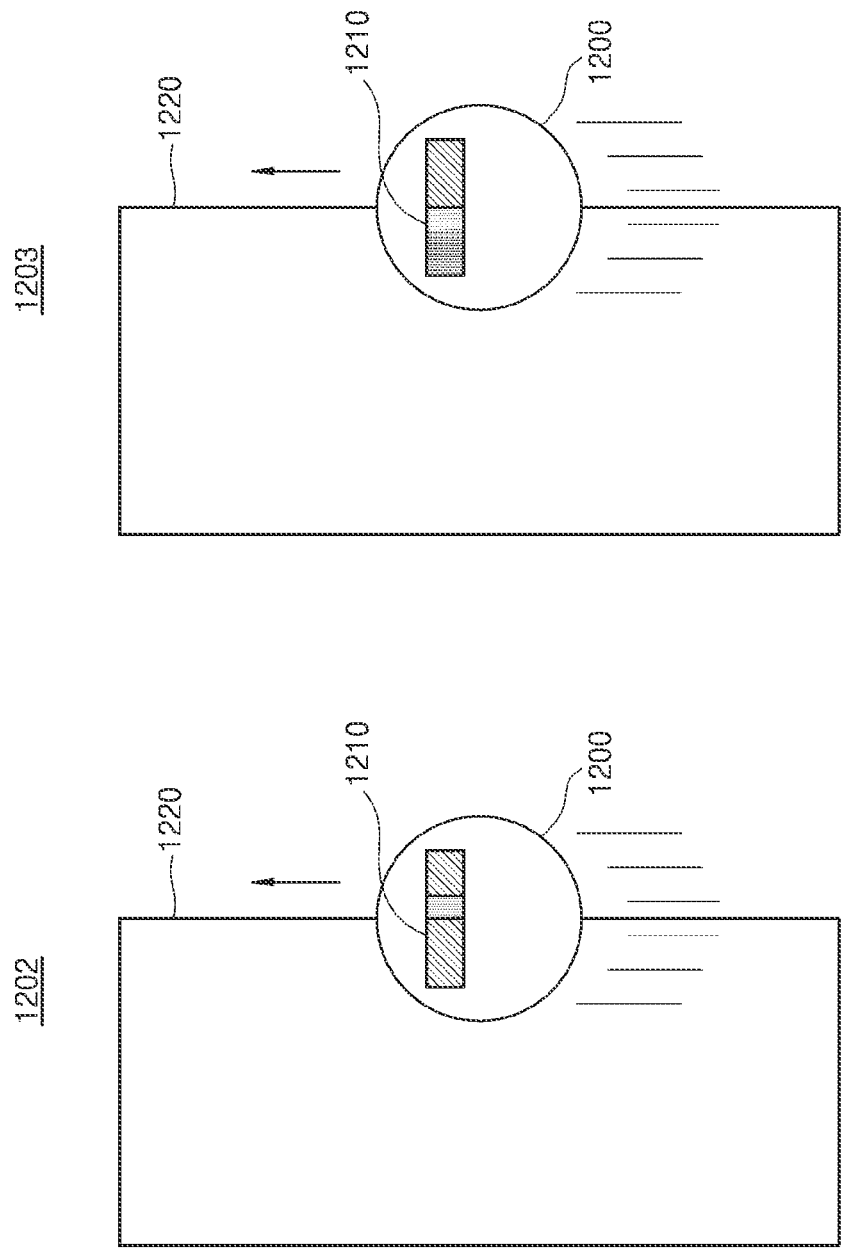

FIGS. 12A and 12B are views for explaining a method, performed by a cleaning device moving over at least one object according to an embodiment of the present disclosure, of determining an open/close target area of a suction port, based on the location of the at least one object located below the cleaning device, when an inclination of the cleaning device is changed to a preset angle or greater.

The cleaning device 1200 according to an embodiment of the present disclosure may sense its own inclination, and, when the inclination of the cleaning device 1200 moving over the at least one object is changed to the preset angle or greater by the at least one object, may determine an open/close target area within the entire area of a suction port, based on the location of the above-described at least one object located below the cleaning device 1200.

For example, the at least one object that changes the inclination of the cleaning device 1200 may be a carpet, a rug, or a threshold. Because a to-be-cleaned object located in an area to be cleaned between an object and a bottom surface of the cleaning device 1200 is far from the suction port of the cleaning device 1200, the cleaning target may not be smoothly sucked into the cleaning device 1200. For example, the object to be cleaned may be entwined with a carpet because of the characteristics of the material of the carpet, and the to-be-cleaned object may not be smoothly sucked into the cleaning device 1200. However, the cleaning device 1200 according to an embodiment of the present disclosure may effectively suck a to-be-cleaned object located above the object and a to-be-cleaned object located between the object and the bottom surface, by opening or closing at least a partial area of the suction port.

Referring to 1201 of FIG. 12A, the cleaning device 1200 moves over an object 1220 and senses, through a sensor, a change of the inclination of the cleaning device 1200 to a preset angle or greater. The preset angle may vary. For example, the preset angle may be, but is not limited to, 1 degree, 5 degrees, 10 degrees, or 15 degrees.

Referring to 1202 of FIG. 12B, the cleaning device 1200 may determine, as an open/close target area, at least a partial area far from an area to be cleaned between the object 1220 and the bottom surface within the entire area of a suction port 1210. For example, the cleaning device 1200 may determine two areas indicated by diagonal lines in 1202 within the entire area of the suction port 1210, as the open/close target area. Then, the cleaning device 1200 may increase a suction force for sucking the to-be-cleaned object located between the object 1220 and the bottom surface, by closing the areas within the entire area of the suction port 1210 determined as the open/close target area and opening a partial area within the entire area of the suction port 1210 that is close to the area to be cleaned between the object 1220 and the bottom surface.

Referring to 1203 of FIG. 12B, the cleaning device 1200 may determine, as an open/close target area, at least a partial area not located over the object 1220 within the entire area of the suction port 1210. For example, the cleaning device 1200 may determine an area indicated by diagonal lines in 1203 within the entire area of the suction port 1210, as the open/close target area. Then, the cleaning device 1200 may increase a suction force for sucking a to-be-cleaned object located over the object 1220 or entwined with the object 1220, by closing the area within the entire area of the suction port 1210 determined as the open/close target area and opening a partial area within the entire area of the suction port 1210 that is located on the object 1220.

FIG. 12C is a view for explaining a method, performed by a cleaning device, of determining an open/close target area of a suction port when an object that changes an inclination of the cleaning device is sensed, according to an embodiment of the present disclosure.

Referring to 1204 of FIG. 12C, the cleaning device 1200 may sense the object 1220 changing the inclination of the cleaning device 1200, before moving over the object 1220. For example, the cleaning device 1200 may sense presence of the object 1220 in the movement direction of the cleaning device 1200 by using at least one of at least one RGB camera, at least one mono/stereo vision camera, at least one LIDAR, at least one RADAR, at least one ultrasonic sensor, or at least one infrared sensor, and may identify the sensed object 1220 as the object 1220 changing the inclination of the cleaning device 1200. Based on a result of the identification, the cleaning device 1200 may open or close the suction port 1210 using the same method as the method described above with reference to FIG. 12B, when the cleaning device 1200 moves over the object 1220.

Figure 13:
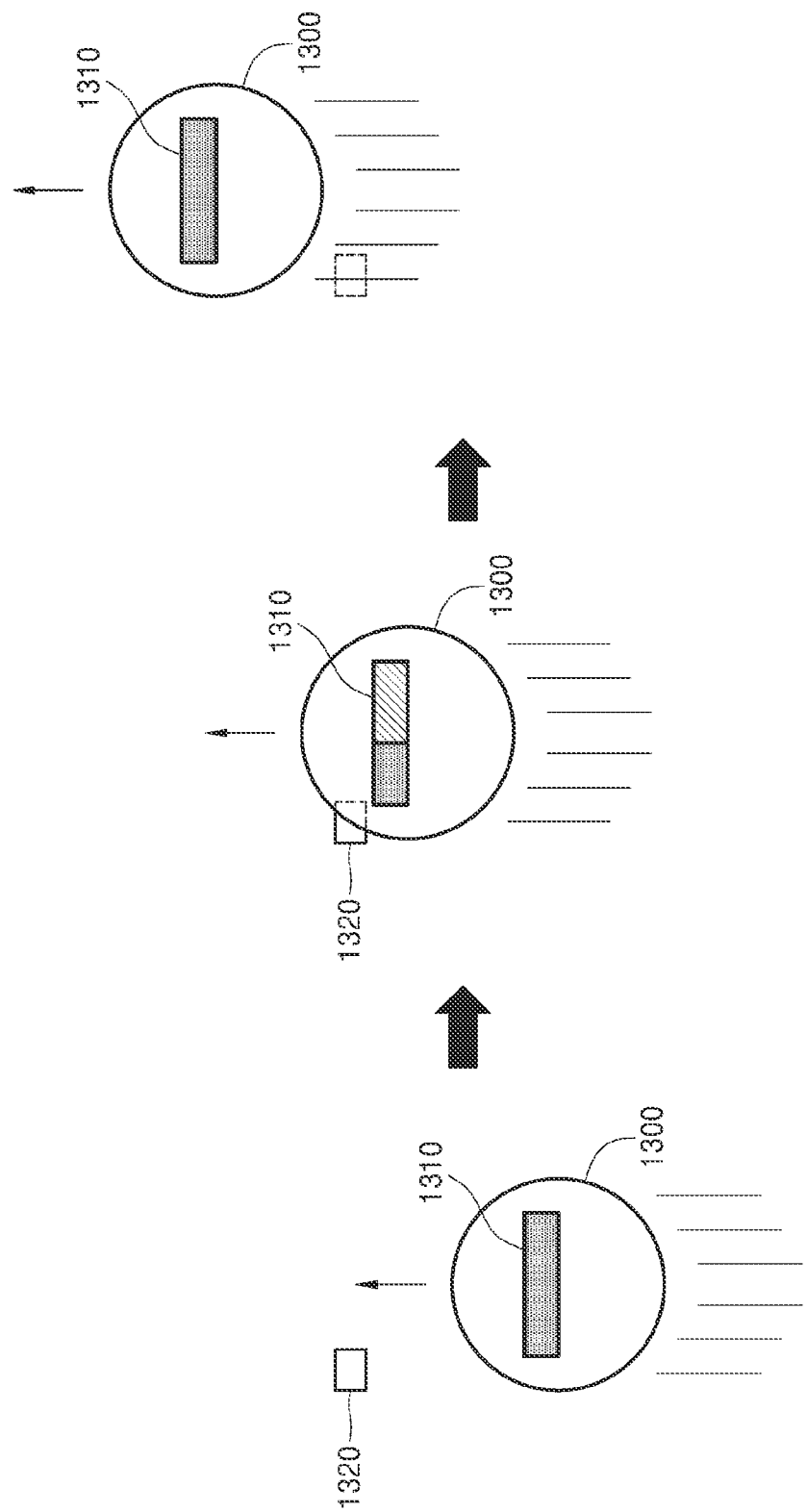
FIGS. 13, 14, and 15 are views for explaining a method, performed by a cleaning device according to an embodiment of the present disclosure, of determining whether to open or close a suction port, based on whether at least one object is a to-be-cleaned object.
Figure 14:
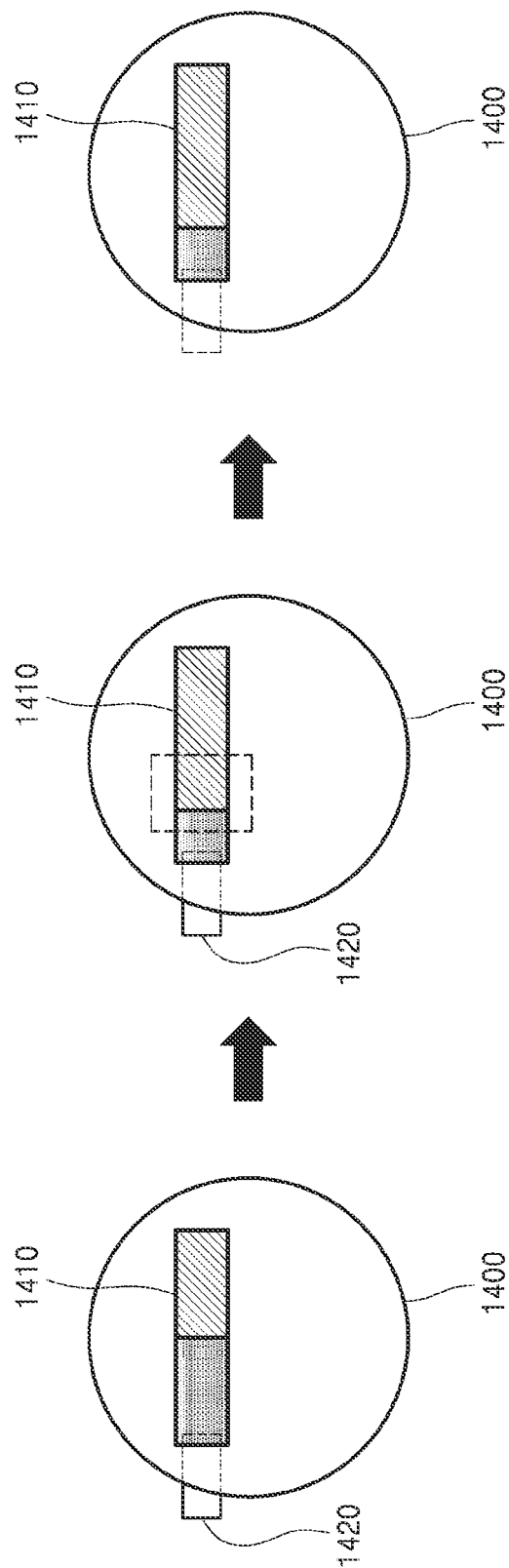
Figure 15:
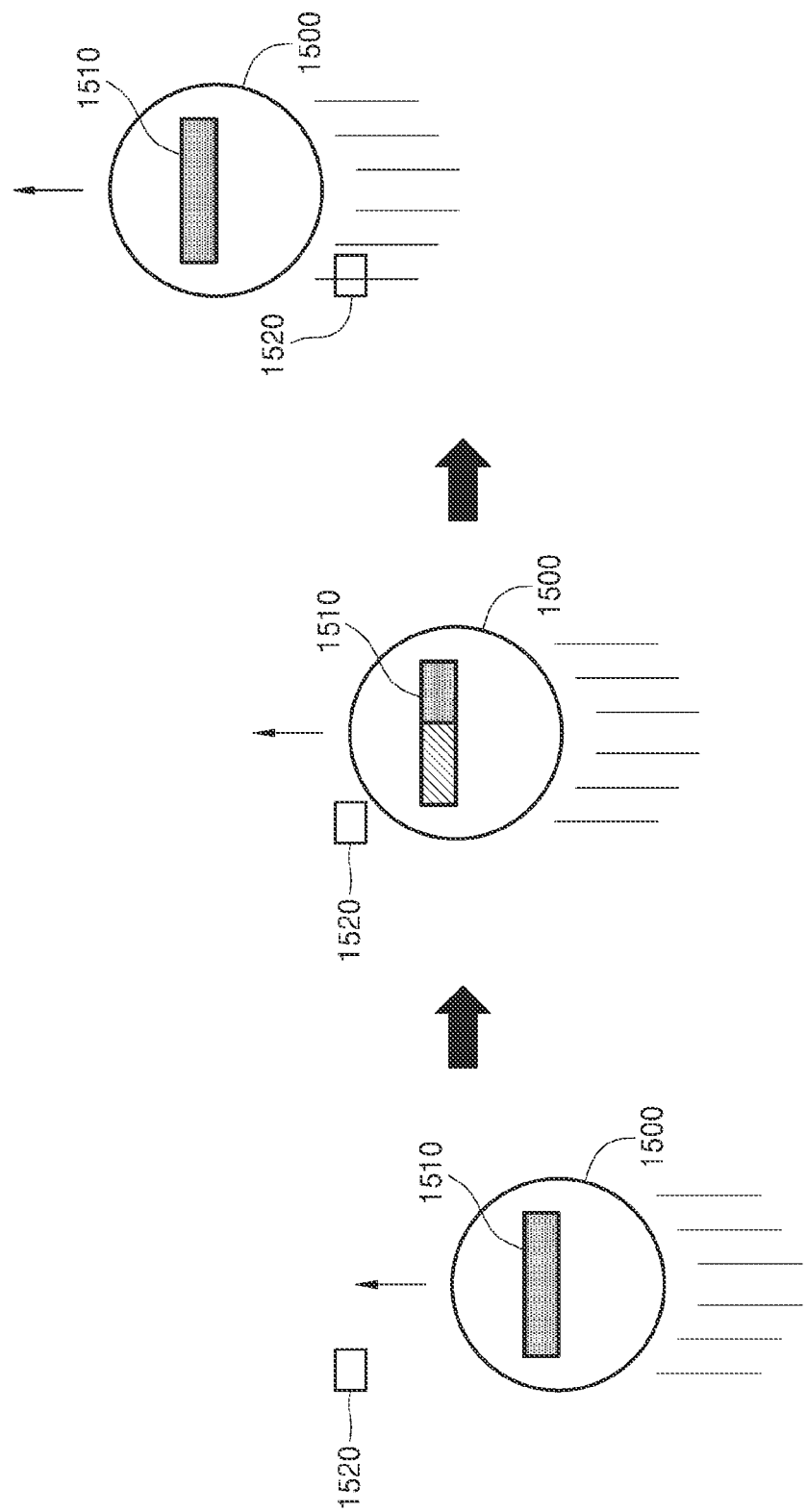

FIGS. 13 through 15 are views for explaining a method, performed by a cleaning device according to an embodiment of the present disclosure, of determining whether to open or close a suction port, based on whether at least one object is a to-be-cleaned object.

The cleaning device 1300 according to an embodiment of the present disclosure may photograph at least one object, determine whether the at least one object is a to-be-cleaned object, and determine whether to open or close a suction port 1310, based on a result of the determination as to whether the at least one object is a to-be-cleaned object. The cleaning device 1300 may determine whether the photographed at least one object is a to-be-cleaned object, through various methods. For example, the cleaning device 1300 may determine whether the photographed at least one object is a to-be-cleaned object, by performing image processing on an image of the photographed at least one object according to a method well known to one of ordinary skill in the image processing field. For example, the cleaning device 1300 may determine whether the photographed at least one object is a to-be-cleaned object, by using a pre-generated learning network model, and this determination method will be described in detail with reference to FIG. 20.

Referring to FIG. 13, the cleaning device 1300 may determine an object 1320 within an area to be cleaned to be a to-be-cleaned object. In this case, the cleaning device 1300 may determine a suction port 1310 to be opened. The cleaning device 1300 may also determine a partial area within the entire area of the suction port 1310 to be opened, and the remaining area to be closed. For example, when the object 1320 is sensed as a to-be-cleaned object having a certain size or greater or a certain weight or greater, the cleaning device 1300 may increase a suction force for sucking the object 1320, by determining a partial area close to the object 1320 within the entire area of the suction port 1310 to be opened and the remaining area to be closed. In the above-described example, the certain size or the certain weight may be determined to be any of various values. Referring to FIG. 13, the cleaning device 1300 may increase a suction force for sucking the object 1320, by closing an area of the suction port 1310 indicated by diagonal lines and opening the remaining area, and may suck the object 1320 and move.

Referring to FIG. 14, the cleaning device 1400 may determine an open/close degree of an open/close target area of a suction port 1410 in order to suck an object 1420 determined to be a to-be-cleaned object. For example, even when the cleaning device 1400 increases a suction force for sucking the object 1420, by closing a partial area of the suction port 1410, as described above with reference to FIG. 13, the object 1420 may not be sucked into the cleaning device 1400. In this case, the cleaning device 1400 may further increase the suction force for sucking the object 1420, by controlling the open/close degree of the suction port 1410 by closing a partial area far from the object 1420 within an open area of the suction port 1410. Referring to FIG. 14, the cleaning device 1400 may increase the suction force for sucking the object 1420, by further closing the suction port 1410 as indicated by a rectangle marked by a dotted line, and may suck the object 1420 and move.

Referring to FIG. 15, the cleaning device 1500 may determine an object 1520 within an area to be cleaned to be not a to-be-cleaned object. In other words, the cleaning device 1500 may determine the object 1520 as a not-to-be-cleaned object. In this case, the cleaning device 1500 may determine a suction port 1510 to be closed. The cleaning device 1500 may also determine a partial area within the entire area of the suction port 1510 to be closed, and the remaining area to be opened. For example, the cleaning device 1500 may determine at least a partial area close to the object 1520 within the entire area of the suction port 1510 to be closed and the remaining area to be opened, thereby sucking a to-be-cleaned object located around the open area and also not sucking a not-to-be-cleaned object. Referring to FIG. 15, the cleaning device 1500 may suck the object 1520 determined as a not-to-be-cleaned object and move, by closing an area of the suction port 1510 indicated by diagonal lines and opening the remaining area.

Figure 16:
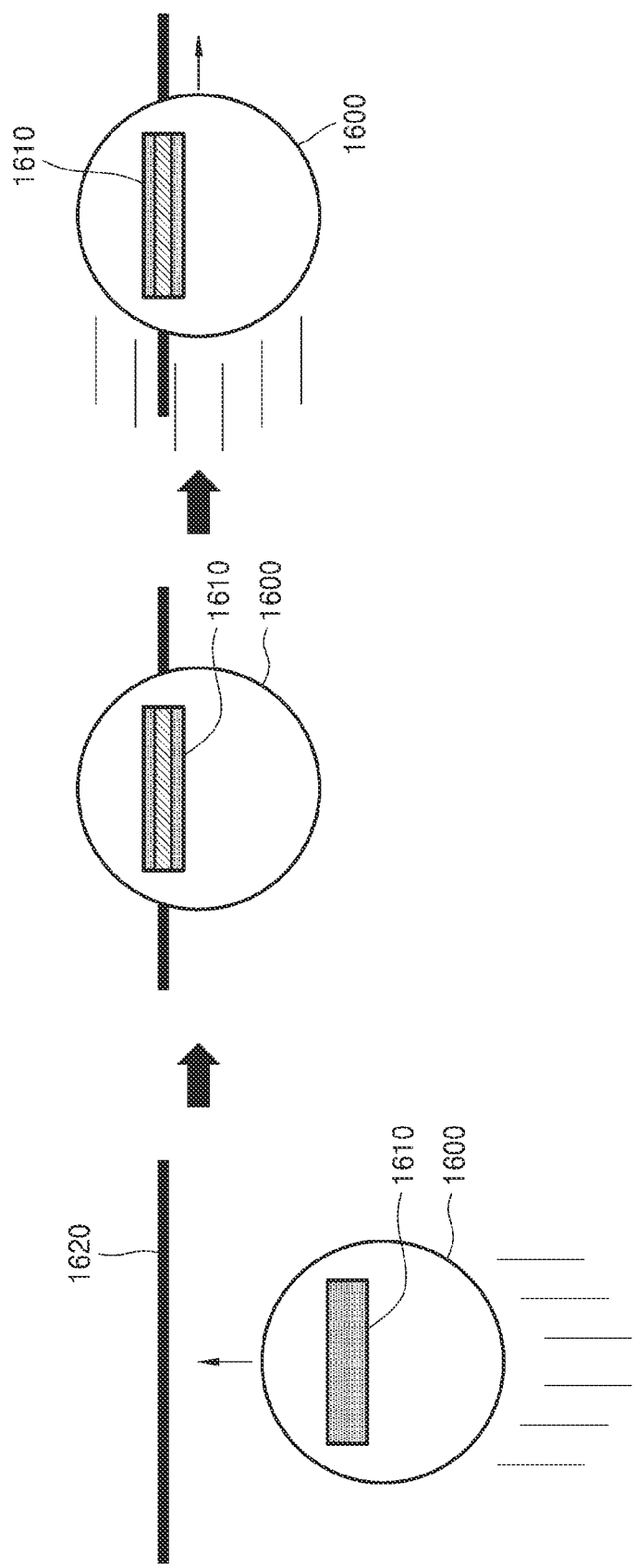
FIG. 16 is a view for explaining a method, performed by a cleaning device according to an embodiment of the present disclosure, of determining an open/close target area of a suction port when the cleaning device senses a long object such as an electric line or a floor gap.

FIG. 16 is a view for explaining a method, performed by a cleaning device according to an embodiment of the present disclosure, of determining an open/close target area of a suction port when the cleaning device senses a long object such as an electric line or a floor gap.

For example, the cleaning device 1600 may suck a to-be-cleaned object around an electric line 1620 while not sucking the electric line 1620, by closing at least a partial area close to the electric line 1620 within the entire area of a suction port 1610 and opening the remaining area.

For example, although not shown in FIG. 16, when the cleaning device 1600 cleans around a floor gap, the cleaning device 1600 may suck a to-be-cleaned object caught in the floor gap by closing a partial area close to the floor gap within the entire area of the suction port 1610.

Methods, performed by a cleaning device according to an embodiment of the present disclosure, of performing a cleaning operation by opening or closing a suction port in various cleaning environments has been described above. The disclosure may, however, be embodied in many different forms and should not be construed as being limited to the embodiments set forth herein. For example, in various environments other than the above-described cleaning environments, the cleaning device may effectively perform cleaning by increasing or reducing a suction force by identifying the various cleaning environments and opening or closing at least a portion of a suction port.

When at least two of the above-described various cleaning environments happen at the same time, the cleaning device may perform respective suction port opening/closing methods corresponding to the two cleaning environments at the same time. For example, when a to-be-cleaned object and a not-to-be-cleaned object are sensed as being close to each other, the cleaning device may simultaneously perform an operation of opening a partial area close to the to-be-cleaned object within the entire area of the suction port and an operation of closing a partial area close to the not-to-be-cleaned object within the entire area of the suction port.

Figure 17:
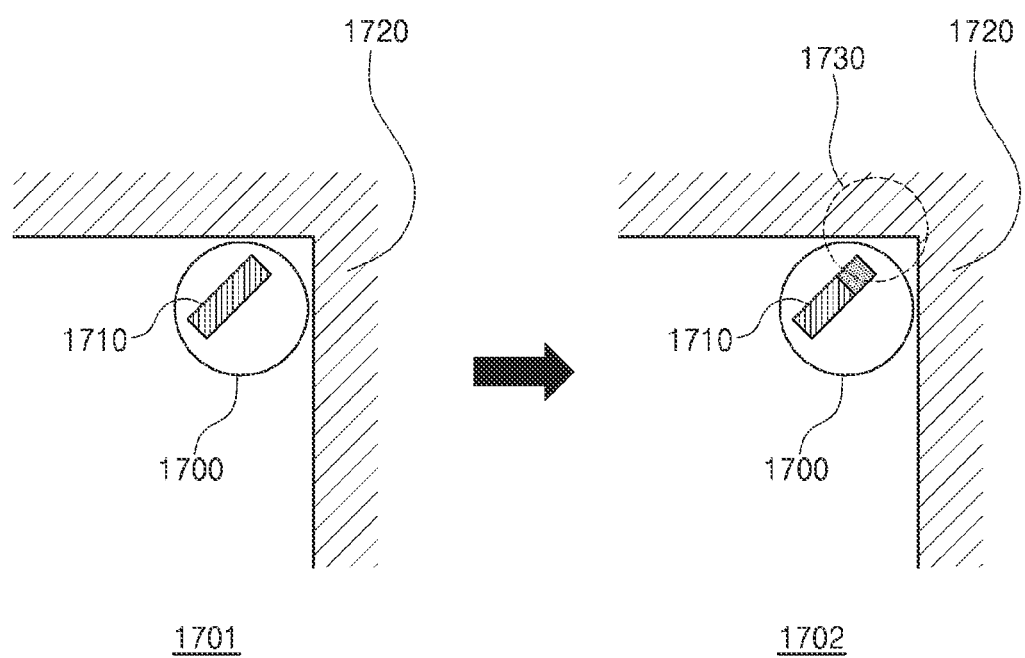
FIG. 17 is a view for explaining a method, performed by a cleaning device according to an embodiment of the present disclosure, of opening or closing an open/close target area within the entire area of a suction port after closing the entire area of the suction port.

FIG. 17 is a view for explaining a method, performed by a cleaning device according to an embodiment of the present disclosure, of opening or closing an open/close target area within the entire area of a suction port after closing the entire area of the suction port.

Referring to FIG. 17, the cleaning device 1700 may reduce a pressure by removing an internal air of a suction port 1710 by closing the entire area of the suction port 1710. Then, the cleaning device 1700 may increase a suction force for sucking air into the suction port 1710, which is in a low pressure state before opening, by opening a partial area of the suction port 1710. The cleaning device 1700 may increase a suction force for sucking a to-be-cleaned object located in a space 1730 formed by an object 1720, by performing the above-described operation.

Figure 18:
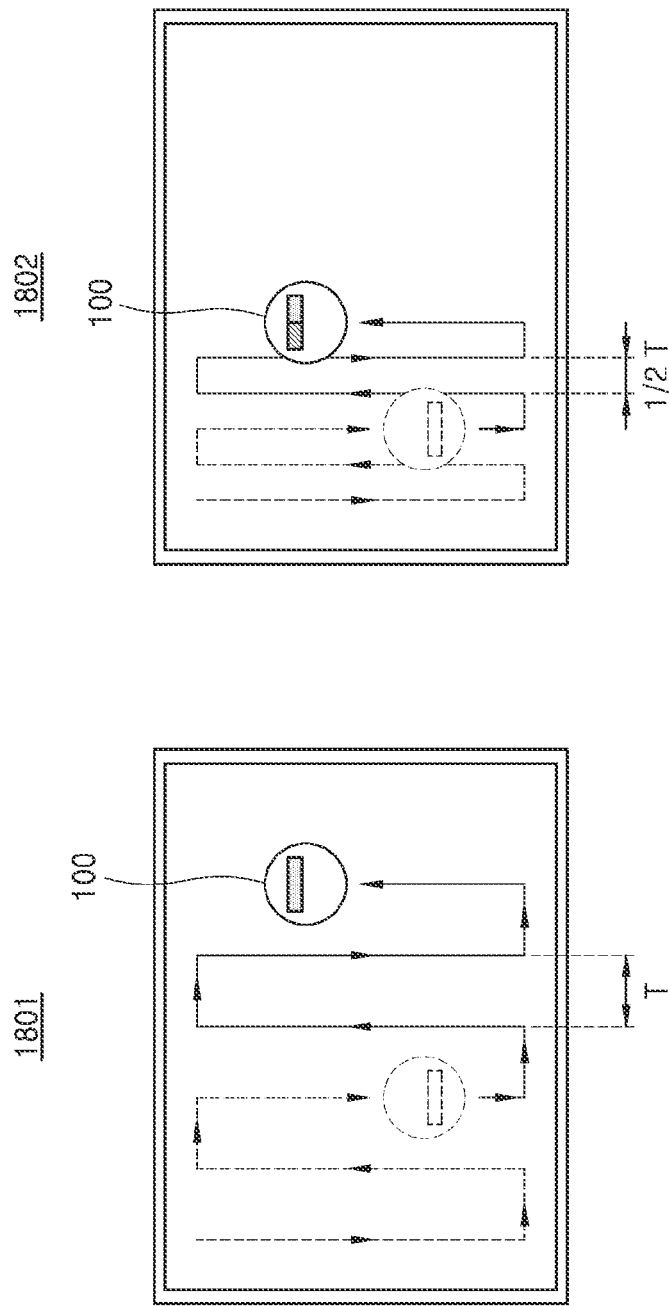
FIG. 18 is a view for explaining a method, performed by a cleaning device according to an embodiment of the present disclosure, of correcting a cleaning path when the cleaning device closes at least a partial area within the entire area of a suction port.

FIG. 18 is a view for explaining a method, performed by a cleaning device according to an embodiment of the present disclosure, of correcting a cleaning path when the cleaning device closes at least a partial area within the entire area of a suction port.

Referring to FIG. 18, the cleaning device 100 may move along a cleaning path in which a cleaning device moves back and forth to clean an area to be cleaned. Referring to 1801, when the entire area of the suction port is open, an interval between parallel paths in the cleaning path of the cleaning device 100 may be T. When the entire area of the suction port is closed, the interval between parallel paths in the cleaning path of the cleaning device 100 may be changed. Referring to 1802, when a half area of the suction port is closed, the interval between parallel paths in the cleaning path of the cleaning device 100 may be changed to ½T. The cleaning device 100 may closely clean an area to be cleaned with an increased suction force, by closing a partial area within the entire area of the suction port and changing the cleaning path.

Figure 19:
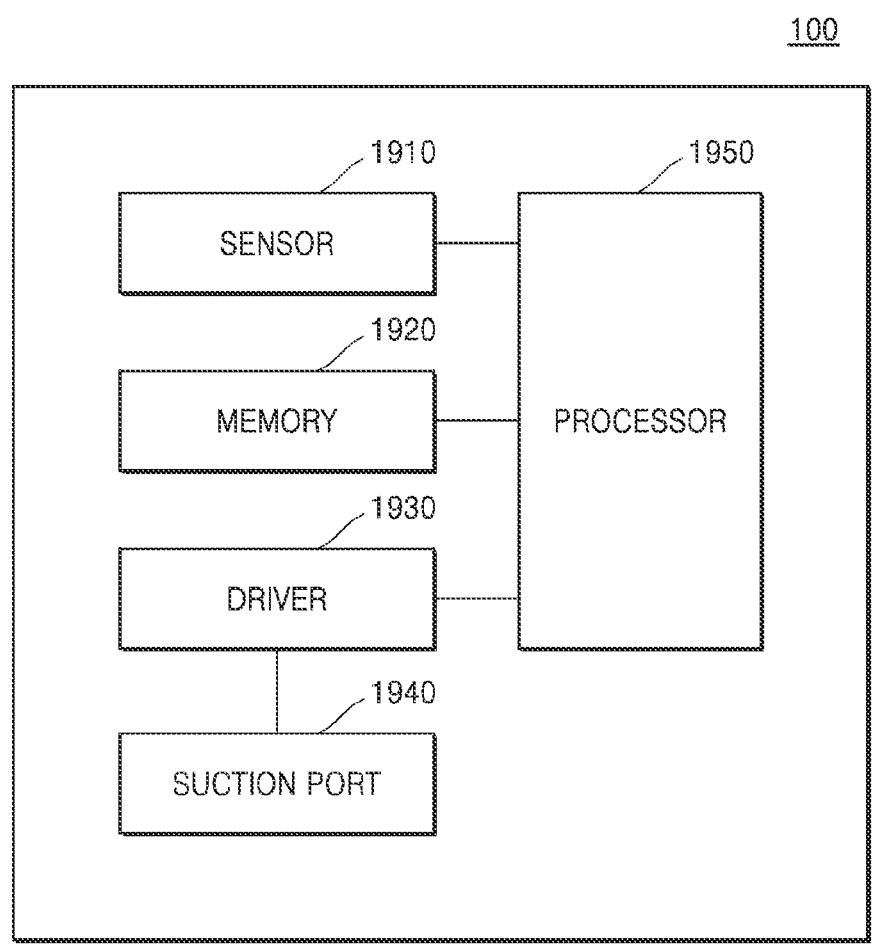
FIG. 19 is a block diagram of a cleaning device according to an embodiment of the disclosure.

FIG. 19 is a block diagram of a cleaning device according to an embodiment of the disclosure.

Referring to FIG. 19, the cleaning device 100 includes a sensor 1910, a memory 1920, a driver 1930, a suction port 1940, and a processor 1950.

The sensor 1910 according to an embodiment of the present disclosure may include at least one of at least one RGB camera, at least one mono/stereo vision camera, at least one Light Detection And Ranging (LIDAR), at least one Radio Detection And Ranging (RADAR), at least one ultrasonic sensor, at least one infrared sensor, at least one collision detection sensor, at least one inclination detection sensor, at least one acceleration sensor, and at least one gyroscopic sensor. The sensor 1910 has been described above with reference to FIG. 9.

The memory 1920 may store programs (one or more instructions) for processing and control by the processor 1950. The programs stored in the memory 1920 may be classified into a plurality of modules according to their functions. According to an embodiment of the disclosure, the memory 1920 may include a data learner and a data recognizer which will be described later with reference to FIG. 20. The data learner and the data recognizer may include independently learning network models or may share a single learning network model.

The driver 1930 performs various operations of the cleaning device 100 under the control of the processor 1950. For example, the driver 1930 may open at least a partial area within the entire area of the suction port 1940. The driver 1930 may include a fan motor that generates a suction force. The driver 1930 may rotate the cleaning device 100. The driver 1930 may include at least one motor for performing an operation of the cleaning device described above by referring to FIGS. 1 through 18.

The suction port 1940 sucks a to-be-cleaned object located in an area to be cleaned. In detail, the suction port 1940 may perform a cleaning operation by sucking a to-be-cleaned object located around the suction port 1940 when the cleaning device 100 is moving or is at a standstill.

The processor 1950 may execute the programs (one or more instructions) stored in the memory 1920, and may include a single core, a dual core, a triple core, or a multiple core thereof.

According to an embodiment of the disclosure, the processor 1950 may perform an operation of the cleaning device described above with reference to FIGS. 1 through 18. For example, the processor 1950 may sense at least one object within an area to be cleaned by the cleaning device 100 by controlling at least one sensor, may identify a relative location of the sensed at least one object with respect to the cleaning device 100, may determine at least a partial area within the entire area of the suction port as an open/close target area, based on the identified relative location of the at least one object, and may open or close the open/close target area by controlling the driver 1930. For example, the processor 1950 may determine whether a photographed object is a to-be-cleaned object, by performing image processing on an image of the photographed object. For example, the processor 1950 may determine whether the photographed object is a to-be-cleaned object, by using a pre-generated learning network model.

According to an embodiment of the present disclosure, the processor 1950 may determine an open/close degree of the open/close target area, based on the identified relative location of the at least one object, and may open or close the open/close target area according to the determined open/close degree by controlling the driver 1930.

According to an embodiment of the present disclosure, the processor 1950 may identify a location of the sensed at least one object within the area to be cleaned, may identify a location of the cleaning device 100, and may determine at least a partial area within the entire area of the suction port 1940 as the open/close target area, based on the location of the cleaning device 100 and the location of the at least one object.

According to an embodiment of the present disclosure, the processor 1950 may control the driver 1930 to move at least one partition for opening or closing the open/close target area, from among a plurality of partitions for opening or closing the suction port 1940, to open or close the open/close target area.

According to an embodiment of the present disclosure, the processor 1950 may control the driver 1930 to move a first partition from among the plurality of partitions to open and close a first split area and a second split area from among a plurality of areas into which the suction port 1940 is split, and move a second partition from among the plurality of partitions to open and close the second split area and a third split area from among the plurality of areas. The entire area of the suction port 1940 may be split into the plurality of areas, the plurality of areas may include the first split area, the second split area, and the third split area, and the first split area, the second split area, and the third split area may be adjacent to each other.

According to an embodiment of the present disclosure, the processor 1950 may determine a direction to move at least one partition, based on a movement direction of the cleaning device 100, and may open and close the open/close target area by moving the at least one partition in the determined direction by controlling the driver 1930.

According to an embodiment of the present disclosure, the processor 1950 may rotate a brush provided in the suction port 1940 by controlling the driver 1930, and may control movement of at least one partition contacting the rotating brush by controlling rotation of the brush.

According to an embodiment of the present disclosure, the processor 1950 may identify whether at least one object is an object that blocks movement of the cleaning device 100, and, when the at least one object is identified as an object that blocks movement of the cleaning device 100, may determine an open/close target area, based on a location of the cleaning device 100, a direction in which movement of the cleaning device 100 is blocked, and the identified relative location of the at least one object.

According to an embodiment of the present disclosure, the processor 1950 may sense an inclination of the cleaning device 100 by controlling at least one sensor, and, when the inclination of the cleaning device 100 moving over the at least one object is changed to a preset angle or greater by the at least one object, may determine an open/close target area, based on the location of the at least one object located below the cleaning device 100.

According to an embodiment of the present disclosure, the processor 1950 may photograph the at least one object by controlling the at least one sensor, may determine whether the at least one object is a to-be-cleaned object, and may determine whether to open or close the suction port 1940, based on a result of the determination.

According to an embodiment of the present disclosure, the processor 1950 may control the driver 1930 to open the open/close target area within the entire area of the suction port 1940, after closing the entire area of the suction port 1940.

According to an embodiment of the present disclosure, the processor 1950 may determine whether the at least one object is a to-be-cleaned object, by using a learning network model previously generated based on the characteristics of at least one to-be-cleaned object and at least one not-to-be-cleaned object obtained by the cleaning device 100.

The processor 1950 may further include a random access memory (RAM) (not shown) and a read-only memory (ROM) (not shown) that temporarily and/or permanently store signals (or data) that are processed in the processor 1950. The processor 1950 may be implemented as a system-on-chip (SoC) including at least one of a graphic processing unit, a RAM, and a ROM.

Figure 20:
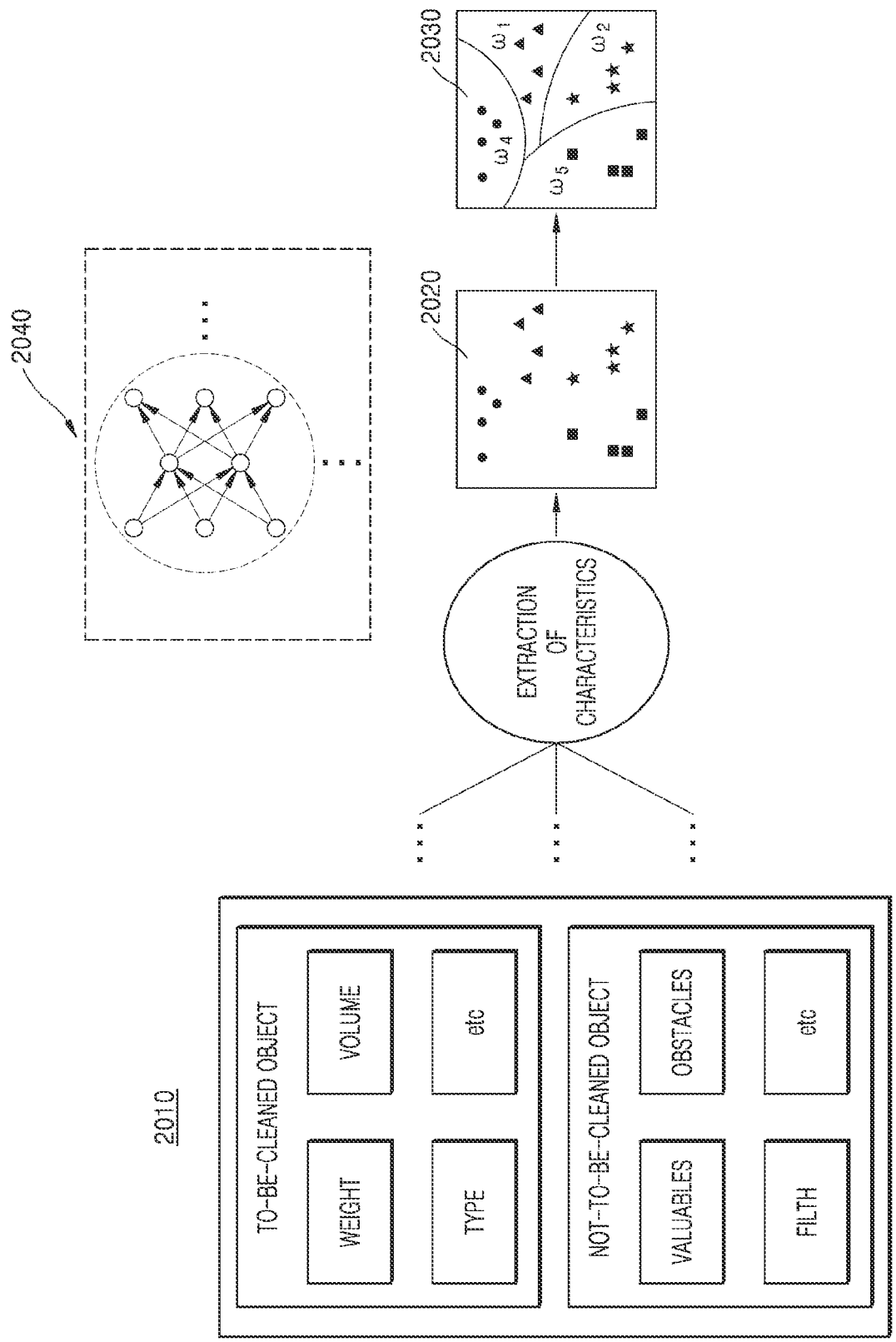
FIG. 20 is a view for explaining a method, performed by a cleaning device according to an embodiment of the present disclosure, of determining whether at least one object is a to-be-cleaned object, by using a learning network model previously generated based on the characteristics of at least one to-be-cleaned object and at least one not-to-be-cleaned object obtained by the cleaning device.

FIG. 20 is a view for explaining a method, performed by a cleaning device according to an embodiment of the present disclosure, of determining whether at least one object is a to-be-cleaned object, by using a learning network model previously generated based on the characteristics of at least one to-be-cleaned object and at least one not-to-be-cleaned object obtained by the cleaning device.

The cleaning device may determine whether the at least one object is a to-be-cleaned object, by applying information 2010 about to-be-cleaned objects and not-to-be-cleaned objects as an input of the pre-generated learning network model.

The learning network model may include a neural network 2040 pre-trained to output whether an object is a to-be-cleaned object, based on the characteristics of the information 2010 about to-be-cleaned objects and not-to-be-cleaned objects. A parameter of each layer of the neural network 2040 included in the learning network model may be determined through learning to apply a weight to the characteristics of the information 2010 about to-be-cleaned objects and not-to-be-cleaned objects, which are used to determine whether an object is a to-be-cleaned object. The characteristics of the information 2010 about to-be-cleaned objects and not-to-be-cleaned objects may include at least one of the weight, volume, shape, texture, and type of an object. However, this is merely an example, and the characteristics of the information 2010 about to-be-cleaned objects and not-to-be-cleaned objects are not limited thereto. For example, the characteristics of the information 2010 about to-be-cleaned objects and not-to-be-cleaned objects may include at least one of the characteristics of valuables, the characteristics of obstacles, and the characteristics of filth.

Referring to FIG. 20, the cleaning device may input the information 2010 about to-be-cleaned objects and not-to-be-cleaned objects to the learning network model.

The cleaning device may detect characteristics from the information 2010 about to-be-cleaned objects and not-to-be-cleaned objects by using the learning network model, and may generate a characteristic space 2020 including the detected characteristics. The cleaning device may learn a criterion (as indicated by 2030) by analyzing correlations between the characteristics distributed on the characteristic space 2020 and the information 2010 about to-be-cleaned objects and not-to-be-cleaned objects.

By repeating the aforementioned learning process, the cleaning device may generate the learning network model for obtaining whether at least one object is a to-be-cleaned object, in consideration of the characteristics of information about to-be-cleaned objects and not-to-be-cleaned objects.

The cleaning device may obtain, as output data, whether at least one object is a to-be-cleaned object, by applying the information about to-be-cleaned objects and not-to-be-cleaned objects as input data to the generated learning network model. However, this is only an embodiment, and the characteristics input to the generated learning network model are not limited thereto. The cleaning device may also obtain, as output data, the type of at least one object when the at least one object is determined as a not-to-be-cleaned object, by applying the information about to-be-cleaned objects and not-to-be-cleaned objects as input data to the generated learning network model. For example, the cleaning device may obtain, as output data, whether the at least one object is a valuable product, an obstacle, or filth.

Figure 21:
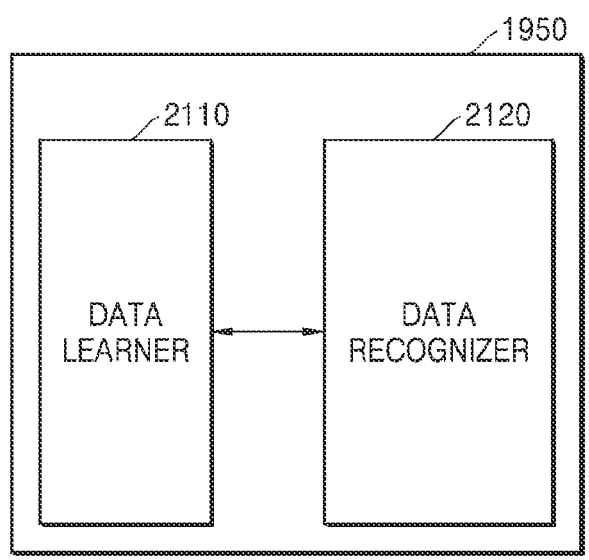
FIG. 21 is a block diagram for explaining a processor according to an embodiment of the present disclosure.

FIG. 21 is a block diagram for explaining a processor according to an embodiment of the present disclosure.

Referring to FIG. 21, the processor 1950 may include a data learner 2110 and a data recognizer 2120.

The data learner 2110 may learn a criterion for determining whether at least one object is a to-be-cleaned object, based on information about to-be-cleaned objects and information about not-to-be-cleaned objects.

The data recognizer 2120 may determine whether at least one object is a to-be-cleaned object, based on the criterion learned by the data learner 2110.

At least one of the data learner 2110 and the data recognizer 2120 may be manufactured in the form of at least one hardware chip and may be mounted on a cleaning device. For example, at least one of the data learner 2110 and the data recognizer 2120 may be manufactured in the form of a dedicated hardware chip for artificial intelligence (AI), or may be manufactured as a portion of an existing general-purpose processor (for example, a CPU or an application processor (AP)) or a processor dedicated to graphics (for example, a GPU) and may be mounted on a cleaning device.

In this case, the data learner 2110 and the data recognizer 2120 may be both mounted on a single cleaning device, or may be respectively mounted on independent cleaning devices. For example, one of the data learner 2110 and the data recognizer 2120 may be included in a cleaning device, and the other may be included in a server. The data learner 2110 and the data recognizer 2120 may be connected to each other by wire or wirelessly, and thus model information established by the data learner 2110 may be provided to the data recognizer 2120 and data input to the data recognizer 2120 may be provided as additional training data to the data learner 2110.

At least one of the data learner 2110 and the data recognizer 2120 may be implemented as a software module. When at least one of the data learner 2110 and the data recognizer 2120 is implemented using a software module (or a program module including instructions), the software module may be stored in non-transitory computer readable media. In this case, the at least one software module may be provided by an operating system (OS) or by a certain application. Alternatively, some of the at least one software module may be provided by an OS and the others may be provided by a certain application.

Figure 22:
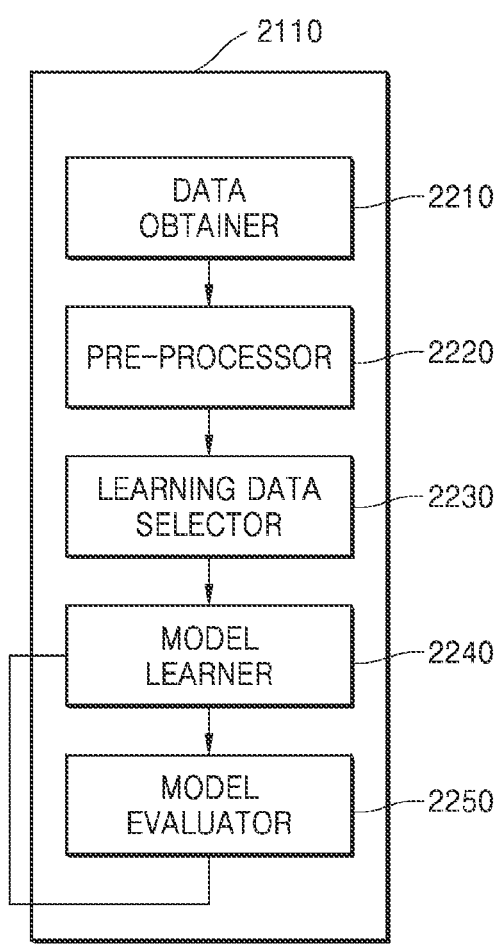
FIG. 22 is a block diagram of a data learner according to an embodiment of the present disclosure.

FIG. 22 is a block diagram of a data learner according to an embodiment of the present disclosure.

Referring to FIG. 22, the data learner 2110 may include a data obtainer 2210, a pre-processor 2220, a learning data selector 2230, a model learner 2240, and a model evaluator 2250. However, this is merely an embodiment, and the data learner 2110 may be configured with fewer components than the above-described components, or other components other than the above-described components may be additionally included in the data learner 2110.

The data obtainer 2210 may obtain, as learning data, information about at least one to-be-cleaned objects and information about at least one not-to-be-cleaned objects received by a cleaning device. For example, the data obtainer 2210 may obtain information about at least one object sensed by a sensor of the cleaning device, as the information about to-be-cleaned objects and the information about not-to-be-cleaned objects.

The pre-processor 2220 may pre-process the obtained information about to-be-cleaned objects and the obtained information about not-to-be-cleaned objects so that the obtained information about to-be-cleaned objects and the obtained information about not-to-be-cleaned objects may be used in learning for determining whether the at least one object is a to-be-cleaned object. The pre-processor 2220 may process the obtained information about to-be-cleaned objects and the obtained information about not-to-be-cleaned objects in a preset format so that the model learner 2240, which will be described later, may use the obtained information about to-be-cleaned objects and the obtained information about not-to-be-cleaned objects in order to achieve the learning.

The learning data selector 2230 may select information about to-be-cleaned objects and information about not-to-be-cleaned objects that are necessary for learning, from among pieces of pre-processed data. The selected information about to-be-cleaned objects and the selected information about not-to-be-cleaned objects may be provided to the model learner 2240. The learning data selector 2230 may select information about to-be-cleaned objects and information about not-to-be-cleaned objects that are necessary for learning, from among pre-processed information about to-be-cleaned objects and pre-processed information about not-to-be-cleaned objects.

The model learner 2240 may learn a criterion for determining whether at least one object is a to-be-cleaned object, based on certain information from among pieces of characteristic information of information about to-be-cleaned objects and information about not-to-be-cleaned objects in a plurality of layers within a learning network model. For example, the model learner 2240 may learn a first criterion regarding characteristic information from which layer is to be used from among the plurality of layers included in the learning network model to determine whether the least one object is to be cleaned. The first criterion may include the types, the number, or the levels of information about to-be-cleaned objects and information about not-to-be-cleaned objects that are used by the cleaning device to determine whether the at least one object is a to-be-cleaned object, by using the learning network model.

According to various embodiments, when a plurality of data recognition models that are pre-established exist, the model learner 2240 may determine a data recognition model having a high relationship between input learning data and basic learning data, as a data recognition model to be learned. In this case, the basic learning data may be pre-classified for each type of data, and the data recognition model may be pre-established for each type of data. For example, the basic learning data may be pre-classified according to various standards such as an area where the learning data is generated, a time for which the learning data is generated, a size of the learning data, a genre of the learning data, a generator of the learning data, and a type of the object in the learning data.

The model learner 2240 may learn the data recognition model through reinforcement learning using a feedback about whether a result of the determination according to learning as to whether the least one object is a to-be-cleaned object is right, for example.

When the data recognition model is learned, the model learner 2240 may store the learned data recognition model. In this case, the model learner 2240 may store the learned data recognition model in a memory of a cleaning device including the data recognizer 2120. Alternatively, the model learner 2240 may store the trained data recognition model in a memory of the cleaning device including the data recognizer 2120, which will be described later. Alternatively, the model learner 2240 may store the learned data recognition model in a memory of a server that is connected with the cleaning device via a wired or wireless network.

In this case, the memory that stores the learned data recognition model may also store, for example, a command or data related to at least one other component of the cleaning device. The memory may also store software and/or a program. The program may include, for example, a kernel, a middleware, an application programming interface (API), and/or an application program (or an application).

When the model evaluator 2250 inputs evaluation data to the data recognition model and a recognition result that is output from the evaluation data does not satisfy a predetermined criterion, the model evaluator 2240 may enable the model learner 2240 to learn again. In this case, the evaluation data may be preset data for evaluating the data recognition model. The evaluation data may include, for example, a match ratio between a determination made based on the learning network model as to whether the at least one object is a to-be-cleaned object and a determination actually made as to whether the at least one object is a to-be-cleaned object.

When there are a plurality of learning network models, the model evaluator 2250 may evaluate whether each of the plurality of learning network models satisfies the predetermined criterion, and may determine, as a final learning network model, a learning network model that satisfies the predetermined criterion.

At least one of the data obtainer 2210, the pre-processor 2220, the learning data selector 2230, the model learner 2240, and the model evaluator 2250 in the data learner 2110 may be manufactured in the form of at least one hardware chip and may be mounted on a cleaning device. For example, at least one of the data obtainer 2210, the pre-processor 2220, the learning data selector 2230, the model learner 2240, and the model evaluator 2250 may be manufactured in the form of a dedicated hardware chip for AI, or may be manufactured as a portion of an existing general-purpose processor (for example, a CPU or an AP) or a processor dedicated to graphics (for example, a GPU) and may be mounted on a cleaning device.

The data obtainer 2210, the pre-processor 2220, the learning data selector 2230, the model learner 2240, and the model evaluator 2250 may be all mounted on a single cleaning device, or may be respectively mounted on independent cleaning devices. For example, some of the data obtainer 2210, the pre-processor 2220, the learning data selector 2230, the model learner 2240, and the model evaluator 2250 may be included in a cleaning device, and the others may be included in a server.

For example, at least one of the data obtainer 2210, the pre-processor 2220, the learning data selector 2230, the model learner 2240, and the model evaluator 2250 may be implemented as a software module. When at least one of the data obtainer 13102210, the pre-processor 13102220, the learning data selector 2230, the model learner 2240, and the model evaluator 2250 is implemented as a software module (or a program module including instructions), the software module may be stored in a non-transitory computer-readable recording medium. In this case, the at least one software module may be provided by an OS or by a certain application. Alternatively, some of the at least one software module may be provided by an OS and the others may be provided by a certain application.

Figure 23:
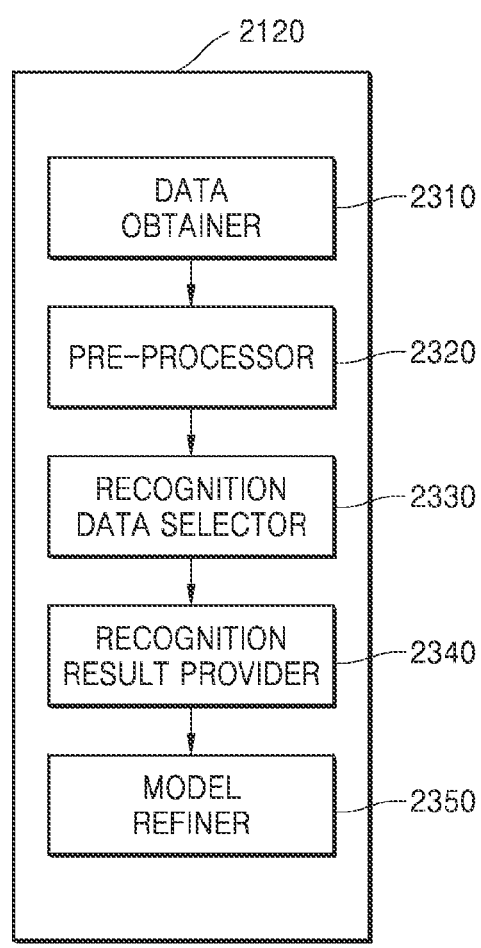
FIG. 23 is a block diagram of a data recognizer according to an embodiment of the present disclosure.

FIG. 23 is a block diagram of a data recognizer according to an embodiment of the present disclosure.

Referring to FIG. 23, the data recognizer 2120 may include a data obtainer 2310, a pre-processor 2320, a recognition data selector 2330, a recognition result provider 2340, and a model refiner 2350.

The data obtainer 2310 may obtain information about at least one to-be-cleaned objects and information about at least one not-to-be-cleaned objects that are necessary for determining whether at least one object is a to-be-cleaned object, and the pre-processor 2320 may pre-process the obtained information about to-be-cleaned objects and the obtained information about not-to-be-cleaned objects so that the obtained information about to-be-cleaned objects and the obtained information about not-to-be-cleaned objects may be used to determine whether the at least one object is a to-be-cleaned object. The pre-processor 2320 may process the obtained information about to-be-cleaned objects and the obtained information about not-to-be-cleaned objects in a preset format so that the recognition result provider 2340, which will be described later, may use the obtained information about to-be-cleaned objects and the obtained information about not-to-be-cleaned objects in order to determine whether the at least one object is a to-be-cleaned object. The recognition data selector 2330 may select information about to-be-cleaned objects and information about not-to-be-cleaned objects that are necessary for determining whether the at least one object is a to-be-cleaned object, from among pieces of pre-processed data. The selected information about to-be-cleaned objects and the selected information about not-to-be-cleaned objects may be provided to the recognition result provider 2340.

The recognition result provider 2340 may determine whether the at least one object is a to-be-cleaned object, by applying the selected information about to-be-cleaned objects and the selected information about not-to-be-cleaned objects to a learning network model according to an embodiment of the present disclosure.

The recognition result provider 2340 may provide whether the at least one object is a to-be-cleaned object, with respect to the information about at least one to-be-cleaned objects and the information about at least one not-to-be-cleaned objects.

The model refiner 2350 may provide information about an evaluation of a result of the determination as to whether the at least one object is a to-be-cleaned object, which is provided by the recognition result provider 2340, to the model learner 2240 of FIG. 22 such that a parameter of a classified network or at least one characteristic-extraction layer included in the learning network model, for example, is refined.

At least one of the data obtainer 2310, the pre-processor 2320, the recognition data selector 2330, the recognition result provider 2340, and the model refiner 2350 within the data recognizer 2120 may be manufactured in the form of at least one hardware chip and may be mounted on a cleaning device. For example, at least one of the data obtainer 2310, the pre-processor 2320, the recognition data selector 2330, the recognition result provider 2340, and the model refiner 2350 may be manufactured in the form of a dedicated hardware chip for AI, or may be manufactured as a portion of an existing general-purpose processor (for example, a CPU or an AP) or a processor dedicated to graphics (for example, a GPU) and may be mounted on a cleaning device.

The data obtainer 2310, the pre-processor 2320, the recognition data selector 2330, the recognition result provider 2340, and the model refiner 2350 may be all mounted on a single cleaning device, or may be respectively mounted on independent cleaning devices. For example, some of the data obtainer 2310, the pre-processor 2320, the recognition data selector 2330, the recognition result provider 2340, and the model refiner 2350 may be included in a cleaning device, and the others may be included in a server.

At least one of the data obtainer 2310, the pre-processor 2320, the recognition data selector 2330, the recognition result provider 2340, and the model refiner 2350 may be implemented as a software module. When at least one of the data obtainer 2310, the pre-processor 2320, the recognition data selector 2330, the recognition result provider 2340, and the model refiner 2350 is implemented as a software module (or a program module including instructions), the software module may be stored in a non-transitory computer-readable recording medium. In this case, the at least one software module may be provided by an OS or by a certain application. Alternatively, some of the at least one software module may be provided by an OS and the others may be provided by a certain application.

An operation method of a cleaning device according to an embodiment of the present disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a RAM, or a flash memory. Examples of the program commands are advanced language codes that can be executed by a computer by using an interpreter or the like as well as machine language codes made by a compiler.

Also, operation methods of cleaning devices according to the disclosed embodiments may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of a display device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. Alternatively, if there is a third device (e.g., a smartphone) in communication with the server or client device, the computer program product may include a storage medium of the third device. Alternatively, the computer program product may include the S/W program itself transmitted from the server to the client device or the third device, or transmitted from the third device to the client device.

In this case, one of the server, the client device, and the third device may execute the computer program product to perform the methods according to the disclosed embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

While one or more embodiments have been described with reference to the figures, it will be understood by those of ordinary skill in the art that various changes in form and details may be made therein without departing from the spirit and scope as defined by the following claims.

The invention claimed is:

1. A method, performed by a cleaning device, of controlling a suction port within the cleaning device, the method comprising:
    sensing at least one object within an area to be cleaned by the cleaning device;
    identifying, among the at least one object, a first object that is an object changing an inclination of the cleaning device to a preset angle or greater;
    identifying a relative location of the first object with respect to the cleaning device;
    determining a first area within an entire area of the suction port as an open target area and a second area excluding the first area within the entire area of the suction port as a close target area, based on the identified relative location of the first object; and
    opening the open target area or closing the close target area,
    wherein the first area includes at least a partial area located over the first object within the entire area of the suction port, and
    the second area includes at least a partial area not located over the first object within the entire area of the suction port.

2. The method of claim 1, wherein the opening the open target area or closing the close target area comprises opening the open target area or closing the close target area by moving at least one partition from among a plurality of partitions for opening or closing the suction port.

3. The method of claim 2, wherein the entire area of the suction port is split into a plurality of areas,
    the plurality of areas comprises a first split area, a second split area, and a third split area,
    the first split area, the second split area, and the third split area are adjacent to each other,
    a first partition from among the plurality of partitions is configured to move to open or close the first split area and the second split area, and
    a second partition from among the plurality of partitions is configured to move to open or close the second split area and the third split area.

4. The method of claim 2, wherein the opening the open target area or closing the close target area comprises:
    determining a direction to move the at least one partition, based on a movement direction of the cleaning device; and
    opening the open target area or closing the close target area by moving the at least one partition in the determined direction.

5. The method of claim 2, wherein the opening the open target area or closing the close target area comprises rotating a brush provided in the suction port, wherein movement of the at least one partition in contact with the rotating brush is controlled by the rotating brush.

6. The method of claim 1, further comprising:
sensing an inclination of the cleaning device, and
wherein the identifying the first object comprises identifying the first object is an object changing an inclination of the cleaning device to a preset angle or greater based on the sensed inclination.

7. The method of claim 1, wherein the opening the open target area or closing the close target area comprises opening the open target area within the entire area of the suction port after the entire area of the suction port is closed.

8. A cleaning device comprising:
a suction port;
at least one sensor configured to sense at least one object;
a driver configured to open or close the suction port;
memory storing at least one instruction; and
a processor configured to execute the at least one instruction stored in the memory,
wherein the processor is configured to execute the at least one instruction to:
sense at least one object within an area to be cleaned by the cleaning device by controlling the at least one sensor;
identify, among the at least one object, a first object that is an object changing an inclination of the cleaning device to a preset angle or greater;
identify a relative location of the first object with respect to the cleaning device;
determine a first area within an entire area of the suction port as an open target area and a second area excluding the first area within the entire area of the suction port as a close target area, based on the identified relative location of the first object; and
open the open target area or close the close target area by controlling the driver,
wherein the first area includes at least a partial area located over the first object within the entire area of the suction port, and
the second area includes at least a partial area not located over the first object within the entire area of the suction port.

9. The cleaning device of claim 8, further comprising:
a plurality of partitions for opening or closing the suction port, and
wherein the processor is configured to execute the at least one instruction to:
open the open target area or close the close target area by moving at least one partition from among the plurality of partitions.

10. The cleaning device of claim 9,
wherein the entire area of the suction port includes a first split area, a second split area and a third split area,
at least two of the first split area, the second split area, and the third split area are adjacent,
a first partition, among the plurality of the partitions, is configured to move for opening or closing the first split area and the second split area,
a second partition, among the plurality of the partitions, is configured to move for opening or closing the second split area and the third split area.

11. The cleaning device of claim 9, further comprising:
a brush provided in the suction port and contacting the plurality of partitions,
wherein the processor is configured to execute at least one instruction to:
rotate the brush by controlling the driver; and
control movement of the at least one partition contacting the rotating brush by controlling rotation of the brush.

12. The cleaning device of claim 8,
wherein the processor is configured to execute the at least one instruction to sense an inclination of the cleaning device, and
wherein the identifying the first object comprises identifying the first object is an object changing an inclination of the cleaning device to a preset angle or greater based on the sensed inclination.

13. The cleaning device of claim 9, wherein the processor is configured to execute the at least one instruction to:
determine a direction to move the at least one partition, based on a movement direction of the cleaning device; and
open the open target area or close the close target area by moving the at least one partition in the determined direction.

14. The cleaning device of claim 8, wherein the processor is configured to execute the at least one instruction to:
open the open target area within the entire area of the suction port after the entire area of the suction port is closed.

15. A non-transitory computer program product including a recording medium having recorded thereon a program for executing operations comprising:
sensing at least one object within an area to be cleaned by a cleaning device;
identifying, among the at least one object, a first object that is an object changing an inclination of the cleaning device to a preset angle or greater;
identifying a relative location of the first object with respect to the cleaning device;
determining a first area within an entire area of a suction port as an open target area and a second area excluding the first area within the entire area of the suction port as a close target area, based on the identified relative location of the first object; and
opening the open target area or closing the close target area,
wherein the first area includes at least a partial area located over the first object within the entire area of the suction port, and
the second area includes at least a partial area not located over the first object within the entire area of the suction port.

* * * * *